United States Patent [19]

Kurosawa et al.

[11] Patent Number: 5,404,472

[45] Date of Patent: Apr. 4, 1995

[54] PARALLEL PROCESSING APPARATUS AND METHOD CAPABLE OF SWITCHING PARALLEL AND SUCCESSIVE PROCESSING MODES

[75] Inventors: Kenichi Kurosawa; Shigeya Tanaka; Yasuhiro Nakatsuka, all of Hitachi; Tadaaki Bandoh, Ibaraki, all of Japan

[73] Assignee: Hitachi, Ltd., Tokyo, Japan

[21] Appl. No.: 149,932

[22] Filed: Nov. 10, 1993

Related U.S. Application Data

[63] Continuation of Ser. No. 549,916, Jul. 9, 1990, Pat. No. 5,287,465, which is a continuation-in-part of Ser. No. 433,368, Nov. 8, 1989, Pat. No. 5,233,694.

[30] Foreign Application Priority Data

Jul. 7, 1989 [JP] Japan .................................. 1-173914

[51] Int. Cl.⁶ ............................................. G06F 9/445
[52] U.S. Cl. ............................. 395/375; 364/DIG. 1; 364/228.7; 364/229; 364/230; 364/230.3; 364/231.9
[58] Field of Search .................. 364/DIG. 1 MS File, 364/DIG. 2 MS File; 395/200, 325, 425, 650, 700, 800; 345, 400

[56] References Cited

U.S. PATENT DOCUMENTS

4,942,525  7/1990  Shintani et al. ..................... 395/375

OTHER PUBLICATIONS

David T. Hilja "Reducing the Branch Penalty in Pipeline Processors," Computer (Jul. 1988) pp. 47–55.
Miller et al. "Floating-Duplex Decode and Execution of Instructions", IBM Technical Disclosure Bulletin, vol. 23, No. 1, (Jun. 1980) pp. 409–412.

*Primary Examiner*—Robert B. Harrell
*Attorney, Agent, or Firm*—Antonelli, Terry, Stout & Kraus

[57] ABSTRACT

When executing successive processing of conventional software, a parallel processing apparatus turns a processing state discrimination flag off, increases a program count by 1 at a time, reads out one instruction, and processes that instruction in an arithmetic unit. When executing parallel processing for new software, the parallel processing apparatus turns the processing state discrimination on, increases the program count by m at a time, reads out m instructions, and exercises parallel processing over m instructions in m arithmetic units. In order to select either of the above described two kinds of processing, a discrimination changeover instruction having function of changing over the processing state discrimination flag is added. Instructions are processed in arithmetic unit(s) in accordance with the processing state discrimination flag. In this way, successive processing and parallel processing are provided with compatibility and are selectively executed.

5 Claims, 20 Drawing Sheets

FIG. 10

| CLASSIFICATION | MNEMONIC | OPERATION |
|---|---|---|
| BASIC INSTRUCTIONS | ADD R(S1), R(S2), R(D) | R(S1)+R(S2) → R(D) |
| | SUB R(S1), R(S2), R(D) | R(S1)−R(S2) → R(D) |
| | AND R(S1), R(S2), R(D) | DERIVE LOGICAL PRODUCT OF R(S1) AND R(S2) BIT BY BIT AND STORE RESULT INTO R(D) |
| | OR R(S1), R(S2), R(D) | DERIVE LOGICAL SUM OF R(S1) AND R(S2) BIT BY BIT AND STORE RESULT INTO R(D) |
| | EOR R(S1), R(S2), R(D) | DERIVE EXCLUSIVE OR OF R(S1) AND R(S2) BIT BY BIT AND STORE RESULT INTO R(D) |
| | NOT R(S1), R(D) | DERIVE NEGATION OF R(S1) BIT BY BIT AND STORE RESULT INTO R(D) |
| | SET R(S1), R(S2), R(D) | SHIFT R(S1) BY NUMBER OF BITS INDICATED BY R(S2) AND STORE RESULT INTO R(D) |
| | NOP | DO NOTHING |
| BRANCH INSTRUCTIONS | BRA d | PC+d → PC |
| | BRAcc d | |
| | CALL d | PC → R(0), PC+d → PC |
| | RTN d | R(0) → PC |
| LOAD STORE INSTRUCTIONS | STOR R(S1), R(S2) | WRITE R(S1) INTO MEMORY AS SPECIFIED BY R(S2) |
| | LOAD R(S1), R(D) | WRITE DATA ON MEMORY SPECIFIED BY R(S1) INTO R(D) |
| PROCESSING STATE FLAG ALTERATION INSTRUCTIONS | PEXB d | ON → PSW(PE)<br>PC+d → PC |
| | SEXB d | OFF → PSW(PE)<br>PC+d → PC |

FIG. 11
1 BASIC INSTRUCTION
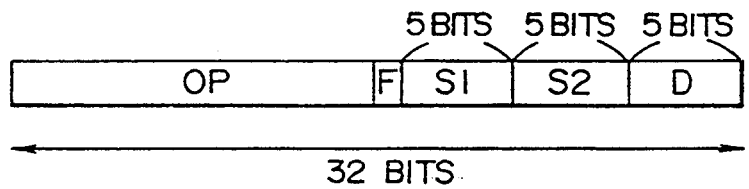
2 BRANCH INSTRUCTION
BRA, CALL RTN 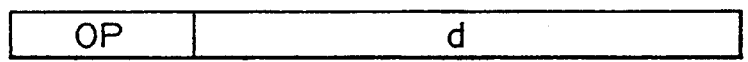
BRAcc 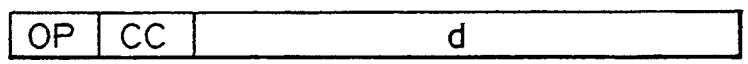
3 LOAD STORE INSTRUCTION
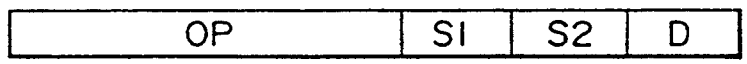

F I G. 18
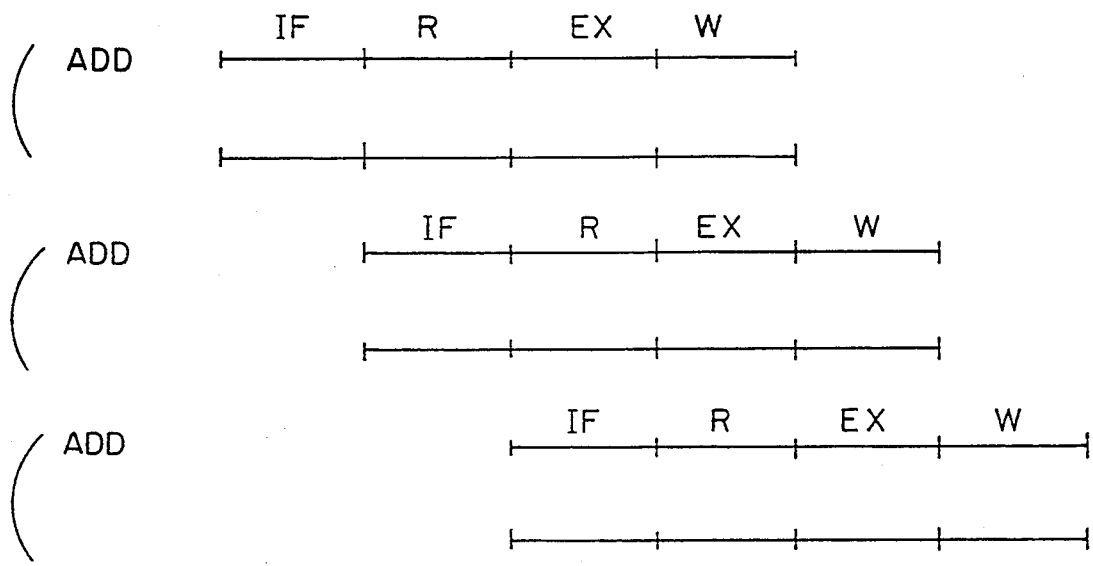
F I G. 19
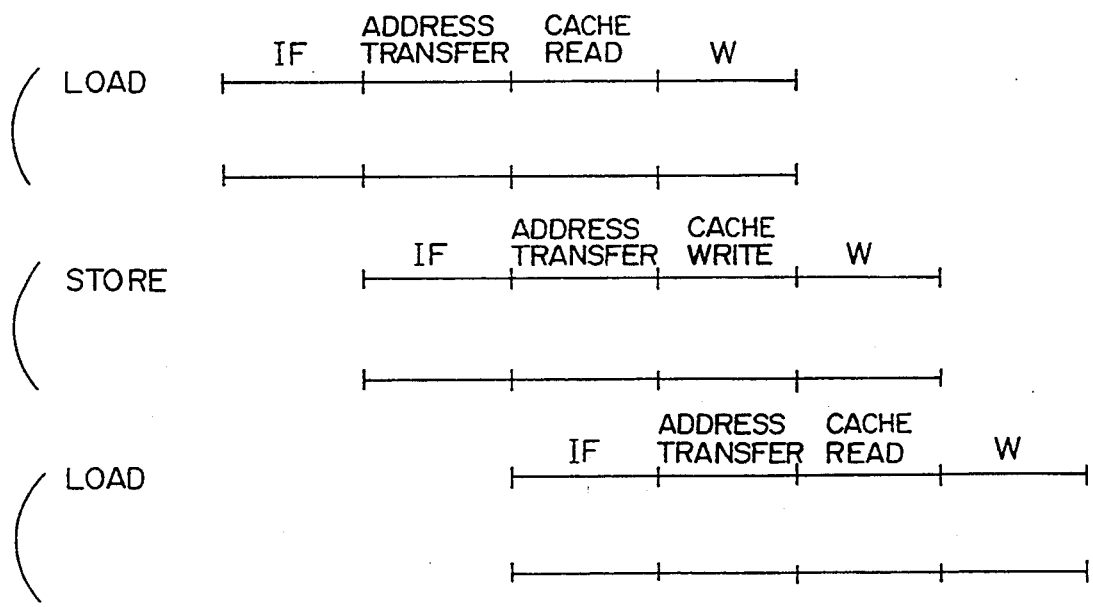

PARALLEL PROCESSING APPARATUS AND METHOD CAPABLE OF SWITCHING PARALLEL AND SUCCESSIVE PROCESSING MODES

CROSS-REFERENCE TO THE RELATED APPLICATION

This application is a Continuation of application Ser. No. 07/549,916, filed Jul. 9, 1990, now U.S. Pat. No. 5,287,465, which is a Continuation-in-Part of U.S. application Ser. No. 07/433,368, filed Nov. 8, 1989, now U.S. Pat. No. 5,233,694, issued Aug. 3, 1993.

As stated, this application is a continuation-in-part application of a U.S. Pat. Application Ser. No. 433,368 filed on Nov. 8, 1989, entitled "Data Processor" filed by Takashi Hotta, Shigeya Tanaka, and Hideo Maejima, and assigned by the present assignee, based on Japanese Patent Application No. 63-283673 filed on Nov. 11, 1988 in Japan, the disclosure of which is incorporated by reference in this application.

BACKGROUND OF THE INVENTION

The present invention relates to CPU's, such as minicomputers or microcomputers, and in particular to a parallel processing apparatus and a parallel processing method suitable for high-speed operation.

Various contrivances have hitherto been made to attain higher-speed operation of computers. One of the representative techniques is the "pipeline" technique. Instead of starting the next instruction after completion of processing of one instruction, each instruction is divided into a plurality of stages in the pipeline technique. When the first instruction comes to its second stage, processing of a first stage of the next instruction is started. Processing is thus performed in a bucket relay manner. Such a method is discussed in detail in Shinji Tomita, "Parallel Computer Structure Review", Shokodo, pp. 25-68. If an n-stage pipeline scheme is used, one instruction is processed at each pipeline stage. As a whole, however, n instructions can be processed simultaneously. Processing of one instruction can be finished every pipeline pitch.

It is well known that the instruction architecture of a computer has a great influence on its processing scheme and processing performance. From the viewpoint of instruction architecture, computers can be classified into CISC's (complex instruction set computers) and RISC's (reduced instruction set computers). In the CISC's, complex instructions are processed by using microinstructions. Instead of narrowing down instructions to simple ones, higher speed is sought with control using hard-wired logic without using microinstructions in the RISC's. An outline of hardware and pipeline operation of both CISC's and RISC's of the prior art will hereafter be described.

FIG. 2 shows typical configuration of a computer of CISC type. Numeral 200 denotes a memory interface, 201 a program counter (PC), 202 an instruction cache, 203 an instruction register, 204 an instruction decoder, 205 an address calculation control circuit, 206 a control storage (CS) for storing microinstructions therein, 207 a microinstruction counter, 208 a microinstruction register, 209 a decoder, 210 an MDR (memory data register) which is a register for transmitting/receiving data to/from a memory, 211 an MAR (memory address register) which is a register for indicating an operand address on the memory, 212 an address adder, 213 a register file, and 214 an ALU (arithmetic and logic unit).

An outline of the operation will now be described. An instruction indicated by the PC 201 is taken out from the instruction cache and set into the instruction register 203 via a signal 217. The instruction decoder 204 receives the instruction via a signal 218 and sets the leading address of the microinstruction into the microinstruction counter 207 via a signal 220. In addition, the instruction decoder 204 informs the address calculation control circuit 205 of the address calculation method via a signal 219. The address calculation control circuit 205 performs register readout required for address calculation and control of the address adder 212. The register required for address calculation is transmitted from the register file 213 to the address adder 212 via buses 226 and 227. On the other hand, microinstructions are read out from the CS 206 every machine cycle, decoded by the decoder 209, and used to control the register file 213. Numeral 224 denotes these control signals. The ALU performs arithmetical operations on data transmitted from registers through buses 228 and 229 and stores the result into the register file 213. The memory interface 200 is a circuit used for correspondence with the memory, such as instruction fetch and operand fetch.

Pipeline operation of the computer shown in FIG. 2 will now be described by referring to FIGS. 3, 4 and 5. The pipeline comprises six stages. At an IF (instruction fetch) stage, an instruction is read out from the instruction cache 202 and set into the instruction register 203. At a D (decode) stage, instruction decoding is performed by the instruction decoder 204. At an A (address) stage, operand address calculation is performed by the address adder 212. At an OF (operand fetch) stage, an operand of an address specified by the MAR 211 is fetched and set into the MDR 210. Succeedingly at an EX (execution) stage, data are called from the register file 213 and the MDR 210 and transmitted to the ALU 214 to undergo an arithmetic operation. Finally, at a W (write) stage, the result of the arithmetic operation is stored into one register included in the register file 213 through the bus 230.

FIG. 3 shows how add instructions ADD are consecutively processed. The add instruction ADD is one the basic instructions. One instruction is processed every machine cycle. Both the ALU 214 and the address adder 212 operate in parallel every cycle.

FIG. 4 shows how a conditional branch instruction BRAcc is processed. A flag is generated by a TEST instruction. FIG. 4 shows a flow performed when a condition is satisfied. Since flag generation is performed at the EX stage, three waiting cycles are caused until an instruction of jump destination is fetched. As the number of pipeline stages is increased, these waiting cycles increase, resulting in an obstacle to performance enhancement. FIG. 5 shows an execution flow of a complicated instruction. An instruction 1 is a complicated instruction. Complicated instructions are instructions having a large number of memory accesses such as string copy, for example. The complicated instruction is processed typically by extending the EX stage a large number of times. The EX stage is controlled by a microinstruction. The microinstruction is accessed once every machine cycle. That is to say, the complicated instruction is processed by reading a microinstruction out of the microprogram a plurality of times. At this time, only one instruction enters the EX stage, and hence a succeeding instruction (instruction 2 of FIG. 5) is made to wait. At such time, the ALU 214 always operates, but the address adder 212 has idle time.

The RISC computer will now be described. FIG. 6 shows typical configuration of an RISC computer. Numeral 601 denotes a memory interface, 602 a program counter, 603 an instruction cache, 604 a sequencer, 605 an instruction register, 606 a decoder, 607 a register file, 608 an ALU, 609 an MDR, and 610 an MAR.

FIG. 7 shows the processing flow of basic instructions. At the IF (instruction fetch) stage, an instruction specified by the program counter 602 is read out from the instruction cache and set into the instruction register 605. On the basis of an instruction signal 615 and a flag signal 616 supplied from the ALU 608, the sequencer 604 controls the program counter 602. At the R (read) stage, a register indicated by the instruction is transferred from the register file 607 to the ALU 608 through buses 618 and 619. At the E (execution) stage, an arithmetic operation is conducted by the ALU 608. Finally at the W (write) stage, the result of arithmetic operation is stored into the register file 607 through a bus 620.

In RISC computers, instructions are limited to only basic instructions. Arithmetic operations are limited to those between registers. Instructions accompanied by operand fetch are only a load instruction and a store instruction. Complicated instructions are implemented by combining basic instructions. Further, microinstructions are not used, but contents of the instruction register 605 are directly decoded by the decoder 606 to control the ALU 608 and so on.

FIG. 7 shows the processing flow of arithmetic operations between registers. Since the instruction is simple, the pipeline comprises only four stages.

FIG. 8 shows the processing flow at the time of a conditional branch. Since the number of pipeline stages is smaller than that of a CISC computer, the number of waiting cycles is small. In the example shown in FIG. 8, the number of waiting cycles is only one. In addition, RISC computers generally use the delayed branch scheme for effectively using this one waiting cycle as well. In this scheme, an ADD instruction succeeding the BRAcc instruction is executed during the waiting cycle as shown in FIG. 9. Since the compiler thus buries an instruction next to the branch instruction, useless waiting cycles can be completely eliminated.

However, RISC computers capable of thus performing efficient execution have a drawback that only one instruction can be executed in one machine cycle.

For recent RISC computers, therefore, a scheme as described in U.S. Pat. No. 4,766,566, "Performance Enhancement Scheme For A RISC Type VLSI Processor Using Dual Execution Units For Parallel Instruction Processing" has been devised. In that scheme, a plurality of arithmetic units sharing a register file are provided, and instructions are simplified to reduce the number of pipeline stages. In addition, a plurality of instructions are read out in one machine cycle to control the plurality of arithmetic units.

In actual RISC computers, however, instructions are processed one after another by using a single arithmetic unit. If a plurality of instructions are executed in parallel by using a plurality of arithmetic units, therefore, the same operation cannot be assured. In interrupt processing, for example, m instructions are simultaneously processed. By taking m instructions as the unit, therefore, when an interrupt is accepted, an operation different from that of successive processing of the prior art results. Further, software such as a debugger having a function of executing instructions by taking one instruction as a unit cannot be used, resulting in one of the drawbacks.

On the other hand, a scheme which makes the above described special software unusable but makes most of the conventional software usable and allows high-speed execution is sufficiently useful. The most important matter in such a scheme is to solve a problem concerning how m instructions including a delayed branch instruction, described before with reference to FIG. 9, should be executed in parallel in order to obtain the same execution result as that obtained in case of successive execution.

SUMMARY OF THE INVENTION

An object of the present invention is to provide compatibility with parallel processing and successive processing while enhancing the processing capability.

Another object of the present invention is to make a great part of conventional software operate normally and allow high-speed execution in parallel operation even though special conventional software cannot operate normally.

In accordance with a first feature of the present invention, a parallel processing apparatus comprises a program counter for indicating an instruction to be read out, m instruction registers for storing indicated instructions therein, a register file for storing data therein, m arithmetic units sharing the register file, processing state discrimination means for indicating which processing is being executed, i.e., for indicating either plural instructions parallel processing for reading out m consecutive instructions from an address indicated by the program counter and processing the m instructions in m arithmetic units, or successive processing for reading out one instruction from an address indicated by the program counter and processing that instruction in one of m arithmetic units, means for selecting either m or 1 as increment of the program counter according to the value indicated by the processing state discrimination means, and means for selectively making the plural instructions parallel processing or successive processing executed. Owing to this configuration, compatibility with parallel processing and successive processing is obtained and these two kinds of processing can be selectively executed.

To be more specific, in case successive processing of conventional software is to be executed, the processing state discrimination means is turned off and the count of the program counter is increased by one at a time. Further, in this case, one instruction is read out and processed in an arithmetic unit.

On the other hand, in case parallel processing plural instructions is to be executed by new software, the processing state discrimination means is turned on and the count of the program counter is increased by m. Further, in this case, m instructions are read out and are processed in parallel in m arithmetic units. For selecting either of the above described two kinds of processing, a discrimination changeover instruction having the function of changing over the processing state discrimination means is added, and m instructions or one instruction are read out from the memory in accordance with the processing state discrimination means and are processed in m arithmetic units or one arithmetic unit.

In accordance with a second feature of the present invention, a parallel processing apparatus comprises a program counter for indicating an instruction to be read out, m instruction registers for storing indicated instructions therein, a register file for storing data therein, arithmetic units sharing the register file and executing an arithmetic operation, plural instructions parallel processing means for reading m consecutive instructions from an address indicated by the program counter and for processing these m instructions in m arithmetic units, conditional branch instruction processing means having a conditional branch instruction and an unconditional branch instruction and preventing execution of instructions located after an address of a delayed slot instruction immediately succeeding a conditional branch instruction upon satisfaction of the condition of the conditional branch instruction included in m instructions read out by the program counter, and unconditional branch instruction processing means for preventing execution of instructions located after an address of a delayed slot instruction immediately succeeding an unconditional branch instruction upon presence of the unconditional branch instruction in the m instructions read out by the program counter. In such configuration, m instructions are first read out and decoded to check if there is a branch instruction in the k-th instruction. Succeedingly, the first to the (k+1)th instructions are executed in the (k+1)th arithmetic unit, and execution of the (k+2)th to the m-th instructions is prevented. By executing the k-th branch instruction, address nm+h of the branch destination is calculated and calculation for checking whether the condition is satisfied or not is performed. Succeedingly, m instructions are read out from address nm. Execution of instructions ranging from the address nm to address nm+h−1 is then prevented, and instructions ranging from the address (nm+h) to address (n+1)m are executed. As a result, a plurality of arithmetic units operate in parallel, and hence a plurality of instructions can be efficiently executed. In addition, branch instructions can also yield the same processing results as those of successive execution.

Further, a parallel processing apparatus having the above described first and second features can be incorporated into an LSI. Further, a parallel processing method providing parallel processing and successive processing with compatibility and a parallel processing method capable of making a great part of conventional software operate normally in parallel processing can also be realized.

BRIEF DESCRIPTION OF THE DRAWINGS

FIG. 10 is a diagram showing a list of instructions of the present invention;

FIG. 11 is a diagram showing instruction formats of the present invention;

FIGS. 18, 19, 20, 21, 22, 23, 24 and 25 are time charts illustrating the operation of successive processing in an embodiment of the present invention;

DESCRIPTION OF THE PREFERRED EMBODIMENTS

An embodiment of the present invention will hereafter the described.

FIG. 10 shows a list of instructions described in the present embodiment. All of the basic instructions are used for arithmetic operation between registers. Branch instructions comprise four instructions, i.e., an unconditional branch instruction BRA, a conditional branch instruction BRAcc (where cc indicates its branch condition), a branch instruction CALL to a subroutine, and a return instruction RTN from the subroutine. In addition, there are a load instruction LOAD and a store instruction STOR. For convenience of description, the data type is limited to 32 bit integer. However, the present invention is not limited to this. Further, it is now assumed that an address is allocated every 32 bits (i.e., 4 bytes). Further, processing state flag alteration instructions comprise a branch instruction PEXB for branching to parallel processing and a branch instruction SEXB for branching to successive processing.. The branch instruction PEXB starts simultaneous readout operations of a plurality of instructions from the instruction of branch destination, activates a plurality of arithmetic units, and turns on the processing state flag. The branch instruction SEXB instruction starts readout operation of one instruction from the instruction of branch destination, activates a first arithmetic unit, and turns off the processing state flag. For brevity, the number of instructions is limited as described above. However, this does not limit the present invention. Instructions may be further increased so long as the contents can be processed in one machine cycle.

FIG. 11 shows the instruction format. Every instruction has a fixed length of 32 bits. In the basic instruction, F, S1, S2 and D fields are a bit indicating whether the result of arithmetic operation should be reflected in the flag, a field indicating a first source register, a field indicating a second source register, and a field indicating a destination register, respectively.

Figure 1A:
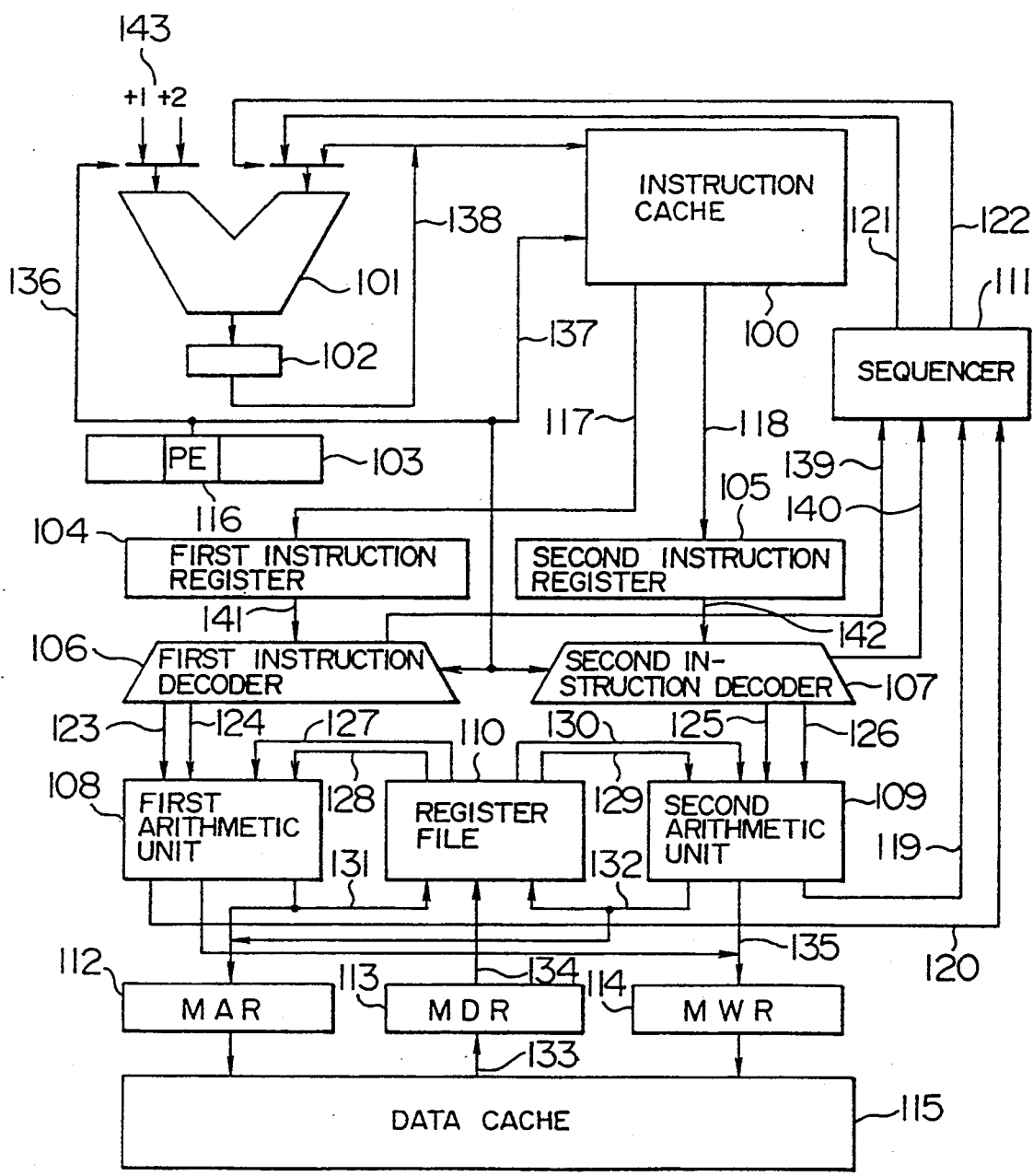
FIG. 1A is a general block diagram showing an embodiment of the present invention.

FIG. 1A shows the configuration of the present embodiment. Numeral 100 denotes an instruction cache, 101 a program count arithmetic unit for generating a 32-bit program count, 102 a latch for holding the value of the program count, 103 a processor status register for holding a processing state flag PE 116, 143 a selector for increasing the program count by "1" or "2", 104 a first instruction register having a capacity of 32 bits, 105 a second instruction register having a capacity of 32 bits, 106 a first instruction decoder, 107 a second instruction decoder, 108 a first arithmetic unit, 109 a second arithmetic unit, 110 a register file, 111 a sequencer, 112 a memory address register MAR, 113 a memory data register MDR, 114 a memory write register MWR, and 115 a data cache.

In the present embodiment, two instructions are read out in parallel and executed during one machine cycle. FIGS. 12 to 15 show the operation of basic pipeline processing in the present embodiment. The pipeline comprises four stages, i.e., IF (instruction fetch), R (read), EX (execution), and W (write) stages.

By referring to FIG. 1A again, operation of the present embodiment will now be described.

At the IF stage, two instructions indicated by the program counter are read out when the value of the processing state flag PE 116 stored in the processor status register 103 is "ON". The two instructions thus read out are set into the first instruction register 104 and the second instruction register 105 via buses 117 and 118, respectively. When the PC is an even number, an instruction of address PC is stored into the first instruction register, and an instruction of address PC+1 is stored into the second instruction register. When the PC is an odd number, an NOP instruction is set into the first instruction register, and an instruction of address PC is set into the second instruction register. That is to say, the sequencer 111 is a circuit for controlling the program counter. When neither the first instruction register nor the second instruction register contains a branch instruction, a value equivalent to the previous program counter value plus 2 is set into the latch 102 as the program count. At the time of branching, the branch address is calculated and set into the program counter. At the time of conditional branch, it is judged whether branch should be performed or not on the basis of flag information 120 supplied from the first arithmetic unit 108 and flag information 119 supplied from the second arithmetic unit 109. The program counter arithmetic unit 101 is controlled by branch destination address information 121 and branch control information 122.

Operation of the R stage in the basic instruction processing will now be described. At the R stage, contents of the first instruction register 104 are decoded by the first instruction decoder 106, and contents of the second instruction register 105 are decoded by the second instruction decoder 107. As a result, contents of a register indicated by a first source register field S1 of the first instruction register 104 and contents of a register indicated by a second source register field S2 are transmitted to the first arithmetic unit 108 through buses 127 and 128, respectively. Further, contents of a register indicated by a first source register field S1 of the second instruction register 105 and contents of a register indicated by a second source register field S2 are transmitted to the second arithmetic unit 109 through buses 129 and 130, respectively.

Operation of the EX stage will now be described. At the EX stage, arithmetic operation between data transmitted through the buses 127 and 128 is conducted in the first arithmetic unit 108 in accordance with contents of an operation code of the first instruction register 104. In parallel therewith, arithmetic operation between data transmitted through the buses 129 and 130 is conducted in the second arithmetic unit 109 in accordance with contents of an operation code of the second instruction register 105.

Finally, operation of the W stage will now be described. At the W stage, the result of the arithmetic operation conducted in the first arithmetic unit 108 is stored into a register indicated by a destination field D of the first instruction register through a bus 131. Further, the result of the arithmetic operation conducted in the second arithmetic unit 109 is stored into a register indicated by a destination field D of the second instruction register through a bus 132.

Figure 1B:
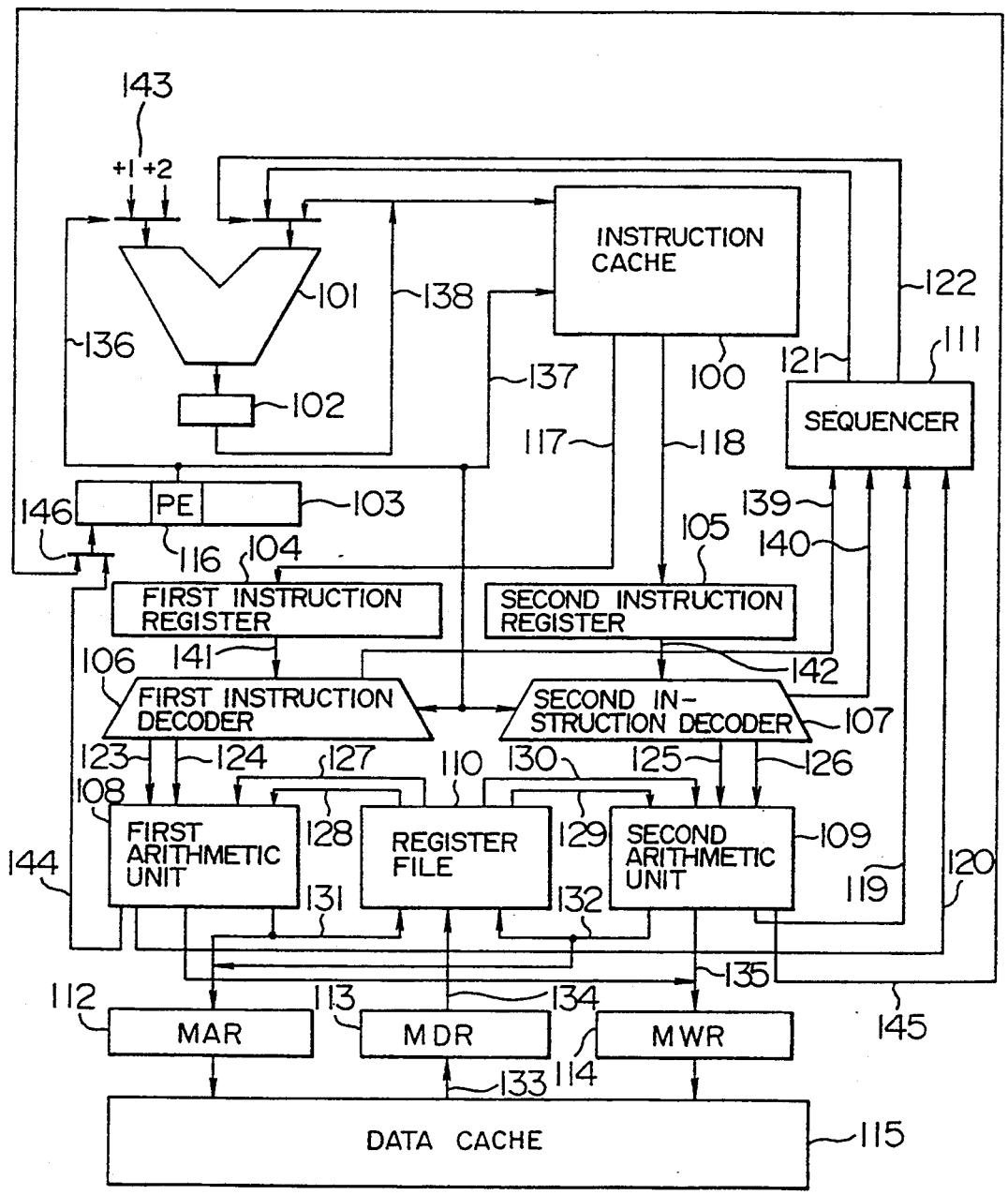
FIG. 1B is a general block diagram showing another embodiment of the present invention.

FIG. 1B is obtained by adding processing state flag alternation means to FIG. 1A. That is to say, numerals 144 and 145 denote data lines for transmitting flag value data to the processing state flag PE 116 when the PEXB and SEXB instructions have been executed in the first arithmetic unit and the second arithmetic unit, respectively. Numeral 146 denotes a selector required when data are to be written into the processing state flag PE 116.

Figure 12:
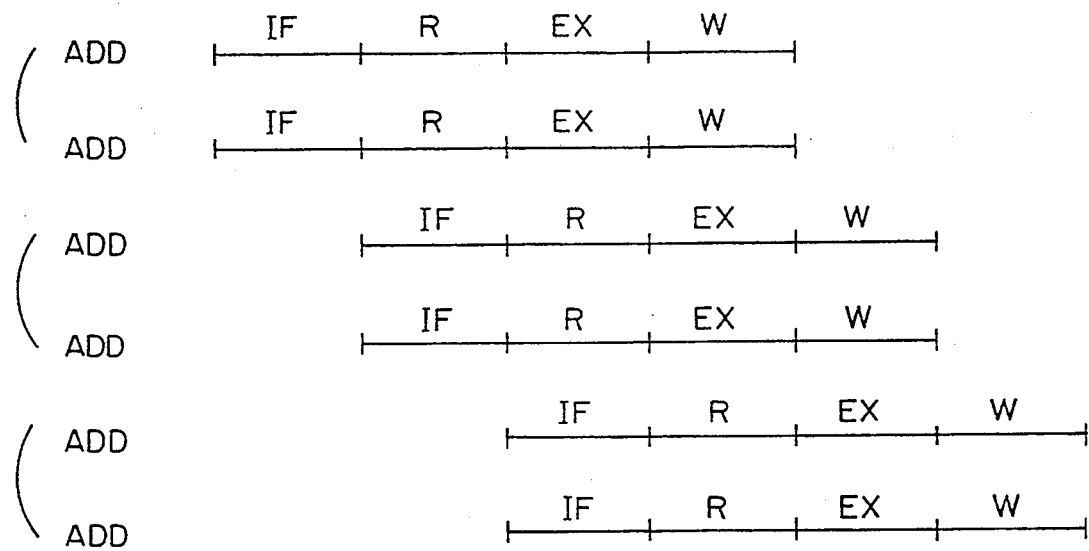
FIGS. 12 and 13 are time charts illustrating the operation in parallel processing of the present invention.

FIG. 12 shows the flow of consecutive processing of basic instructions. Two instructions are processed every machine cycle. In two lines of FIG. 12 representing the processing of two instructions, the upper line represents the processing performed in the first arithmetic unit whereas the lower line represents the processing performed in the second arithmetic unit. Further, in this example, the first arithmetic unit and the second arithmetic unit always operate in parallel.

Figure 13:
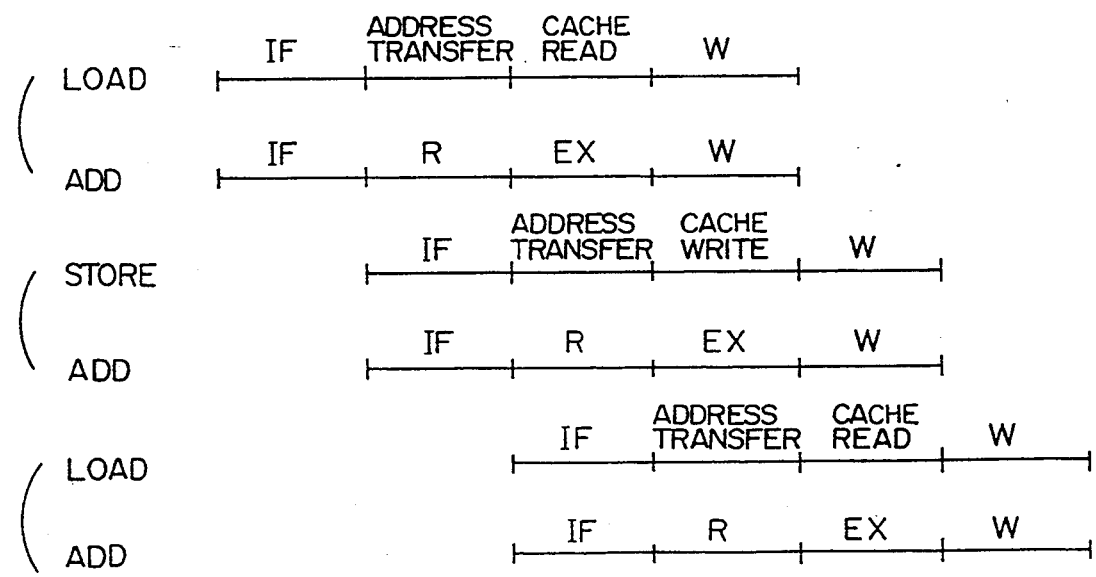
Figure 15:
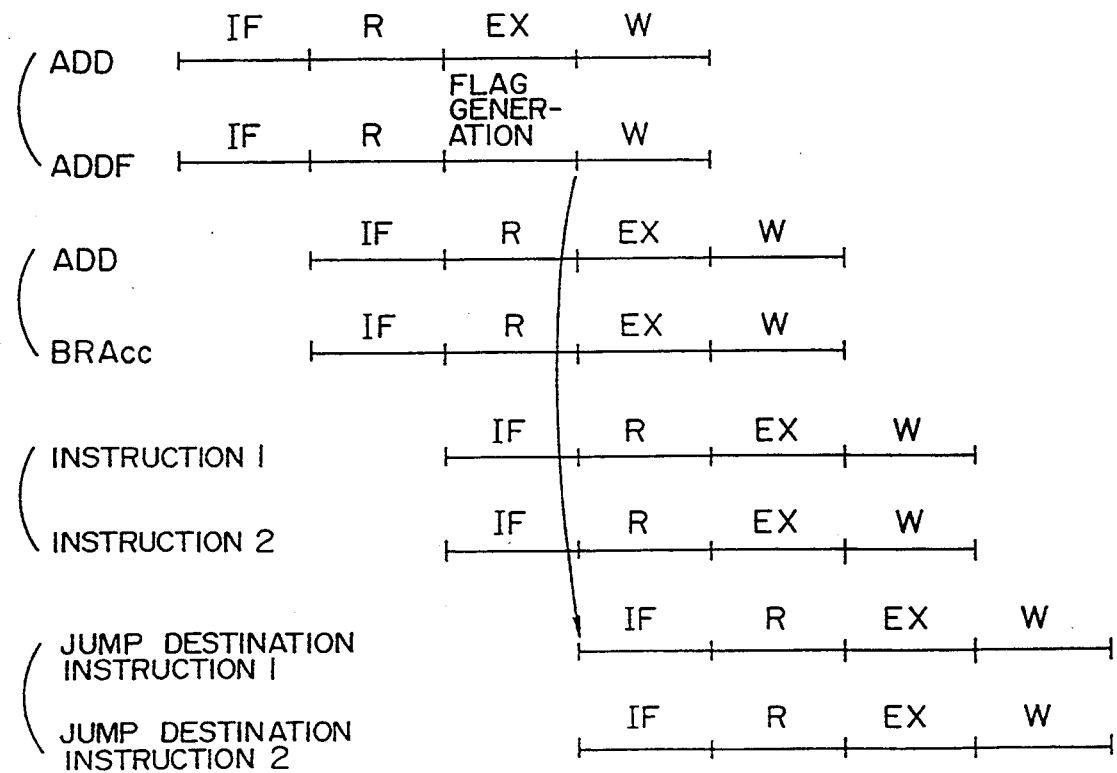
FIGS. 15, 16 and 17 are time charts illustrating the operation in parallel processing.

FIG. 13 shows the flow of consecutive processing of the load instruction or the store instruction as the first instruction and the basic instruction as the second instruction. When the load instruction is to be executed, contents of a register specified by the S2 field of the first instruction register are transferred to the MAR 112 through the bus 128 at the R stage. Succeedingly at the EX stage, an operand is fetched from the data cache through a bus 133. Finally at the W stage, the fetched operand is stored into a register specified by the destination field of the first instruction register through a bus 134. If the high-speed data cache 115 is provided as shown in FIG. 15, it is possible to fetch the operand in one machine cycle at the EX stage. This can be easily accomplished especially in case the entire computer shown in FIG. 1A is integrated on a semiconductor substrate and both the instruction cache and the data cash are contained in chips. It is a matter of course that the operand fetch cannot be finished in one machine cycle if the cache hits by mistake. At such time, the system clock may be stopped and the EX stage may be extended. This is performed in conventional computers as well.

When the store instruction is to be executed, contents of a register specified by the first source register field S1 of the first instruction register are transferred to the MWR 114 through a bus 135 as data at the R stage. At the same time, contents of a register specified by the second source register field S2 of the first instruction register are transferred to the MAR 112 through the bus 128 as an address. Succeedingly at the EX stage, data stored in the MWR 114 is written into the address specified by the MAR 112. As shown in FIG. 13, the load instruction or the store instruction can be processed together with a basic instruction such as the illustrated ADD instruction in one machine cycle. That is to say, two instructions can be processed every machine cycle.

Figure 14A:
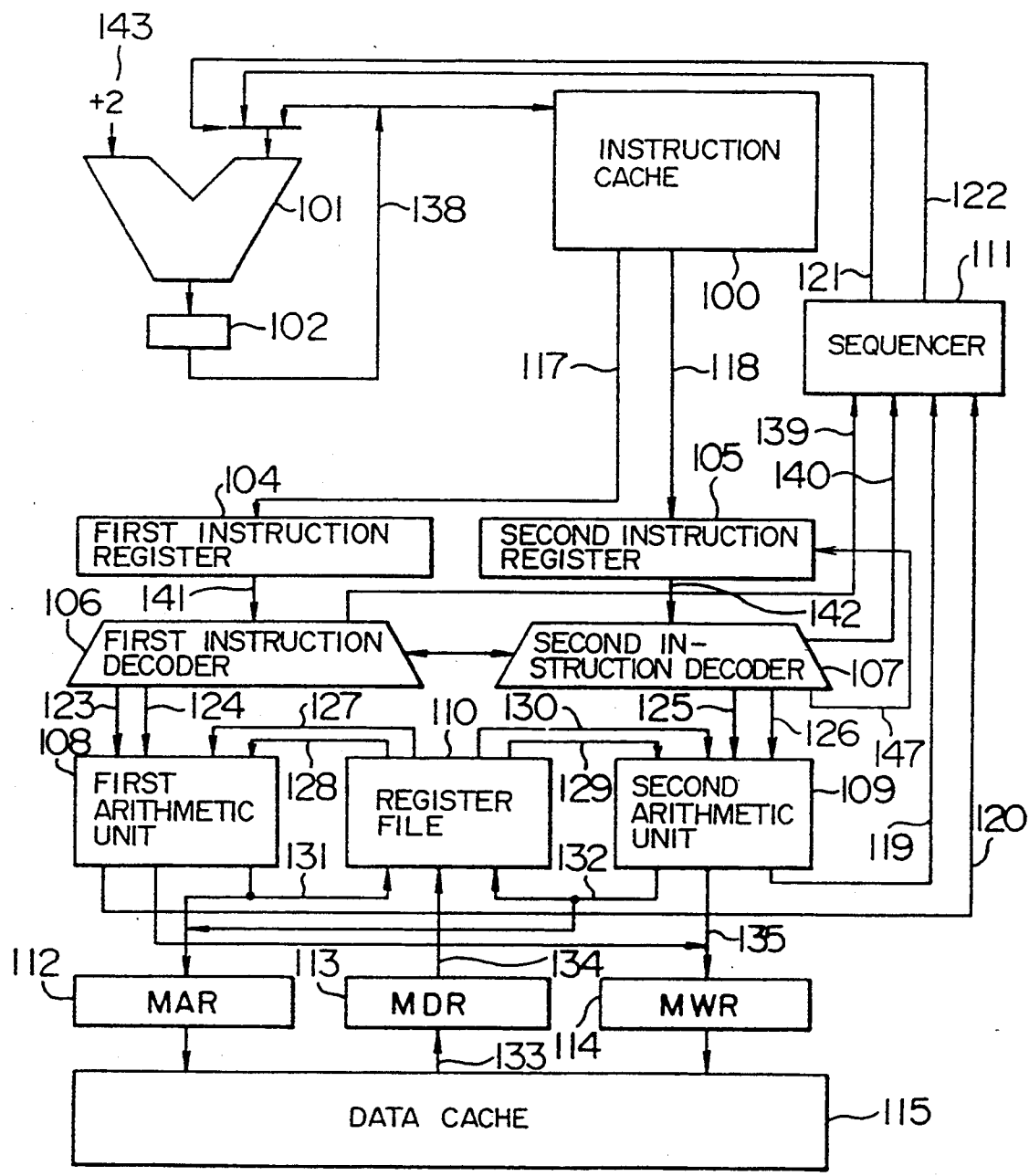
FIG. 14A is a general block diagram showing another embodiment of the present invention.
Figure 14B:
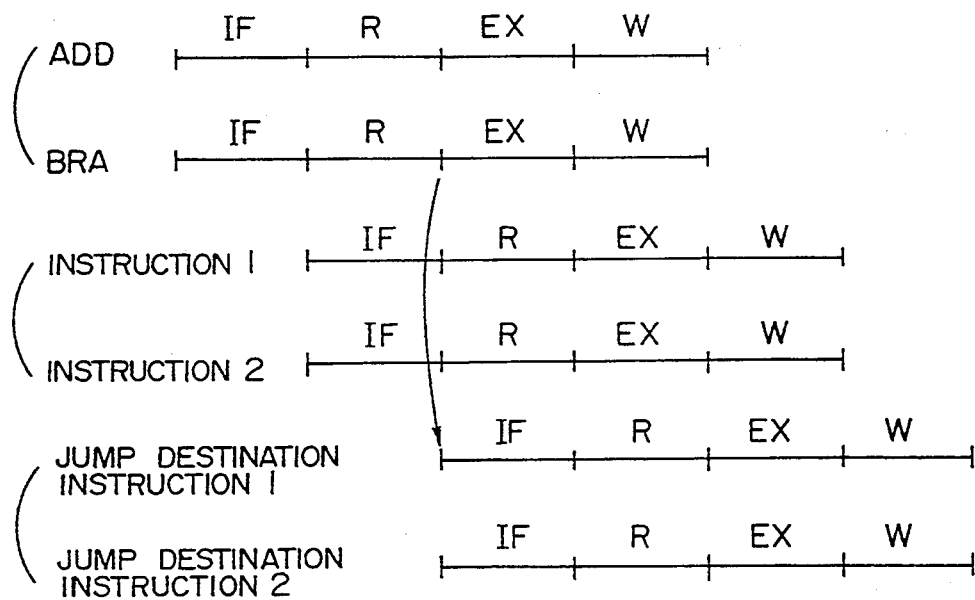
FIG. 14B is a time chart illustrating the operation in parallel processing.

FIG. 14B shows the processing flow used when an unconditional jump instruction BRA is to be executed as the second instruction. FIG. 14B is also used for the description of another embodiment which will be described later. If the BRA instruction is read out, the sequencer 111 adds the displacement field d to the program count and sets the result into the latch 102 of the program counter at the R stage. During this time, an instruction located at an address succeeding that of the BRA instruction and another instruction located at another address succeeding that of the first mentioned instruction (i.e., instructions 1 and 2 of FIG. 14B) are read out. At the next cycle, two instructions of jump destination are read out. In the present embodiment, hardware capable of executing both the instruction 1 and the instruction 2 is used. That is to say, a waiting cycle is not caused at the time of jump instruction processing as well. This technique is called delayed branch and used in conventional RISC computers. In conventional RISC computers, however, only one instruction can be executed during address calculation of the jump instruction. In the present embodiment, however, two instructions are simultaneously processed during address calculation of the jump instruction as well. As a result, the processing capability can be further raised. Processing of the CALL and RTN instructions is performed in a similar flow. Codes are generated by the compiler so that as effective instructions as possible may be executed during address calculation of a branch instruction. When there is nothing to be done, however, the NOP instruction is chosen as the instructions 1 and 2 of FIG. 14B. At this time, a wait of substantially one machine cycle is caused. Since the number of pipeline stages is small, however, overhead at the time of branch can be advantageously made small as compared with CISC computers described before as the prior art.

FIG. 15 shows processing flow used when a conditional branch instruction BRAcc is executed as the second instruction. A flag is set by an instruction denoted by ADD, F, and it is decided in accordance with that result whether branch should be performed or not. At this time as well, an instruction of an address succeeding that of the BRAcc instruction, i.e., instruction 1 of FIG. 15 and another instruction of another address succeeding the address of the first mentioned instruction, i.e., instruction 2 of FIG. 15 are read out and processed in the same way as the processing of the unconditional branch instruction described before by referring to FIG. 14B. In the processing flow of these two instructions, the result of arithmetic operation is written into the register file at the W stage, whether the branch condition of the BRAcc instruction is satisfied or not.

Figure 16:
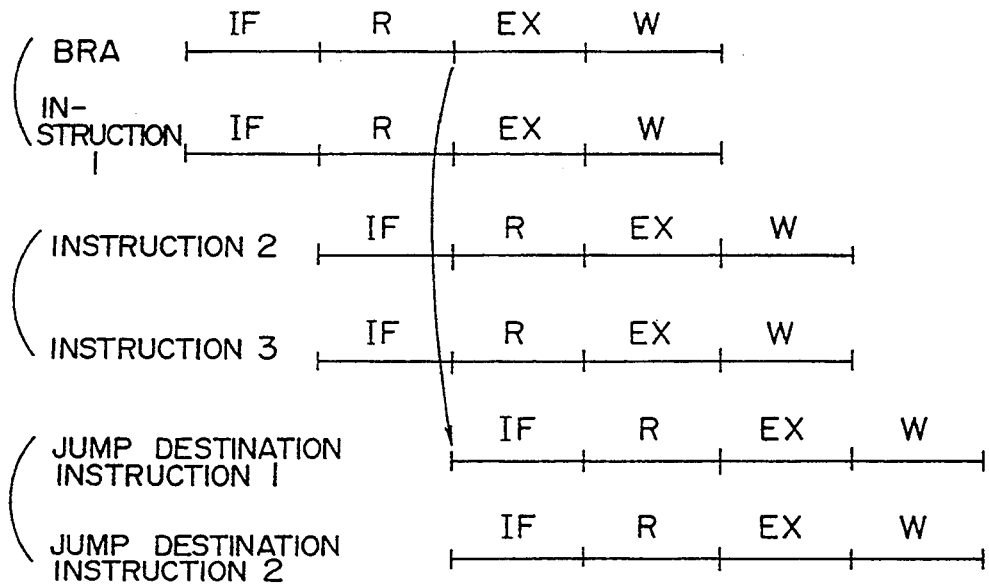
Figure 17:
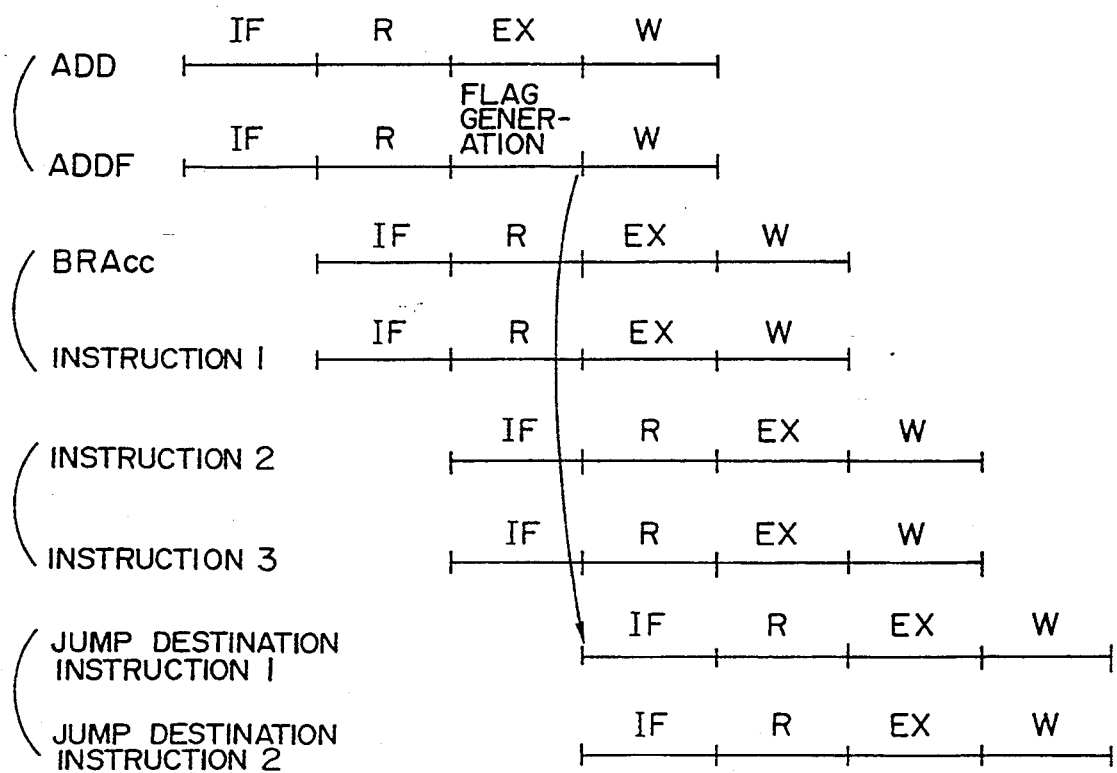

FIG. 16 shows processing flow used when an unconditional branch instruction BRA is executed as the first instruction. If the BRA instruction and the instruction 1 are read out, the sequencer 111 adds the displacement field d to the program count at the R stage and sets the resultant sum into the latch 102 of the program counter. In addition, the sequencer 111 reads the operand of the instruction 1 in parallel. During this time, an instruction 2 located at an address succeeding that of the instruction 1 and another instruction 3 located at another address succeeding that of the instruction 2 are read out. In the present embodiment, the branch instruction and the instruction 1 are executed in parallel, and hardware capable of executing both the instruction 2 and the instruction 3 is used. That is to say, two instructions including a branch instruction are executed in parallel. In addition, two instructions succeeding them are made executable. As for a conventional delayed branch instruction, only one instruction immediately succeeding the branch instruction is executed in parallel. As for a branch instruction in the present embodiment, however, two instructions immediately succeeding the branch instruction are executed in case of FIG. 14B, and three instructions immediately succeeding the branch instruction are executed in case of FIG. 16 unlike the conventional delayed branch. That is to say, the present embodiment differs from the conventional delayed branch in that m instructions including a delayed branch instruction are executed in parallel and m instructions succeeding them are executed by taking advantage of the branch time. As a result, a high degree of parallel processing can be realized. On the other hand, FIG. 17 shows the processing flow used when the conditional branch instruction BRAcc is executed as the first instruction. In the same way as the processing flow of FIG. 16, the BRAcc instruction and an instruction 1 are executed in parallel. By taking advantage of time to branch to jump destination instructions 1 and 2, instructions 2 and 3 are executed whether the condition is satisfied or not. As a result, high degree of parallel execution becomes possible. As understood from FIG. 15 and FIG. 17, two instructions and three instructions immediately succeeding the branch instruction are executed, respectively. In this way, the number of instructions executed at the time of branch differs depending upon whether the branch instruction exists as the first instruction or as the second instruction.

When the value of the processing state flag PE 116 of the processor status register 103 is "ON", two instructions are processed every machine cycle as previously described with referring to FIGS. 12, 13, 14B, 15, 16 and 17. This results in an advantage that the processing capability is raised to twice at its maximum.

When the value of the processing state flag PE 116 of the processor register 103 is "OFF", the program counter is so controlled via a control signal 136 as to increase in count by +1 and the instruction cache 100 is so controlled by a control signal 137 that one instruction having a 32-bit length may be read into the first instruction register 104 via the bus 117. Further, the control signal 136 is supplied to the first instruction decoder 106 and the second instruction decoder 107. As a result, the first instruction decoder functions to process the instruction of the first instruction register 104 in the first arithmetic unit 108, and the second instruction decoder functions to stop the second arithmetic unit. As a result, successive processing by using the first arithmetic unit can be performed.

By referring to FIG. 1B, pipeline operation conducted when the value of the processing state flag PE 116 of the processor status register 103 is "OFF" will now be described in detail.

At the IF stage, one instruction specified by the program counter is read out and set into the first instruction register 104. When the value of the processing state flag PE 116 is "OFF", an effective instruction is not outputted onto the bus 118. That is to say, the sequencer 111 is a circuit for controlling the program counter. When the first instruction register does not contain a branch instruction, the sequencer sets a value equivalent to the previous program count plus one into the latch 102 as the program count. At the time of branch, the sequencer calculates the branch address and sets it into the program counter. At the time of conditional branch, the sequencer judges whether branch should be performed or not on the basis of flag information 120 supplied from the first arithmetic unit 108. By using the destination address information 121 and the branch control information 122, the sequencer controls the program counter arithmetic unit 101.

Operation of the R stage at the time of processing of a basic instruction will now be described. At the R stage, contents of the first instruction register 104 are decoded by the first instruction decoder 106. As a result, contents of a register specified by the first source register field S1 of the first instruction register 104 are transmitted to the first arithmetic unit 108 via the bus 127 and contents of a register specified by the second source register field S2 are transmitted to the first arithmetic unit 108 via the bus 128.

Operation of the EX stage will now be described. At the EX stage, arithmetic operation between data transmitted through the buses 127 and 128 is conducted in the first arithmetic unit 108 in accordance with contents of an operation code of the first instruction registor 104.

Finally, operation of the W stage will now be described. At the W stage, the result of arithmetic operation conducted in the first arithmetic unit 108 is stored into a register indicated by the destination field D of the first instruction register through the bus 131.

FIG. 18 shows the flow of consecutive processing of basic instructions. Although there is a capability to process two instructions every machine cycle, one instruction is processed every machine cycle.

FIG. 19 shows the flow of consecutive processing of the load instruction and the store instruction. When the load instruction is to be executed, contents of a register specified by the S2 field of the first instruction register are transferred to the MAR 112 through the bus 128 at the R stage. Succeedingly at the EX stage, an operand is fetched to the MDR 113 through the data cache 115. Finally at the W stage, the operand fetched at the W stage is stored into a register specified by the destination field D of the first instruction register through the bus 134.

When the store instruction is to be executed, the contents of a register specified by the first source register field S1 of the first instruction register are transferred to the MWR 114 through the bus 135 as data at the R stage. At the same time, contents of a register specified by the second source register field S2 of the first instruction register are transferred to the MAR 112 through the buses 128 and 131 as an address. Succeedingly at the EX stage, data stored in the MWR 114 is written into the address specified by the MAR 112. Although there is a capability to process two instructions every machine cycle, one instruction can be processed every machine cycle even if the load instruction and the store instruction are consecutive as shown in FIG. 19.

Figure 20:
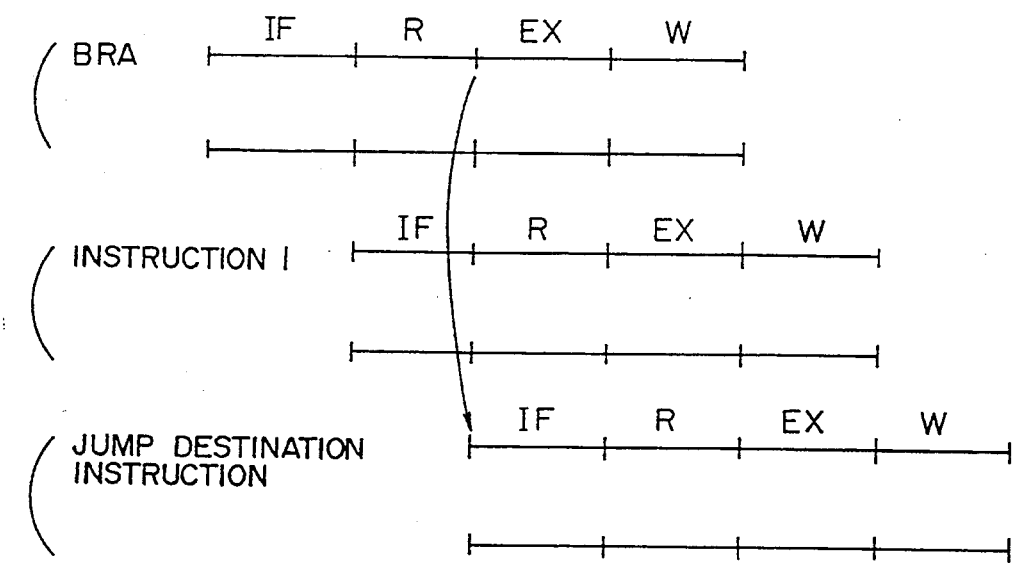

FIG. 20 shows the processing flow used when the unconditional jump instruction BRA is to be executed. If the BRA instruction is read out, the sequencer 111 adds the displacement field d to the program count and sets the resultant sum into the latch 102 of the program counter at the R stage. During this time, an instruction located at an address succeeding that of the BRA instruction is read out. At the next cycle, the jump destination instruction is read out. In the present embodiment, hardware capable of executing the instruction 1 is used. That is to say, a waiting cycle is not caused at the time of jump instruction processing as well.

Operation conducted when the value of the processing state flag PE 116 of the processor status register 103 is "OFF" has heretofore been described. As compared with the operation conducted when the value is "ON", instructions 2 and 3 performed in the delayed branch cannot be executed in the present embodiment. In the same way as conventional RISC computers, however, one instruction can be executed during address calculation of the jump instruction. There is thus obtained an effect that compatibility with the prior art is kept when the value of the processing state flag PE 116 in the present embodiment is "OFF". Processing of the CALL and RTN instructions is performed in a similar flow. Codes are generated by the compiler so that as effective instructions as possible may be executed during address calculation of a branch instruction. When there is nothing to be done, however, the NOP instruction is chosen as the instruction 1 of FIG. 20. At this time, a wait of substantially one machine cycle is caused.

Figure 21:
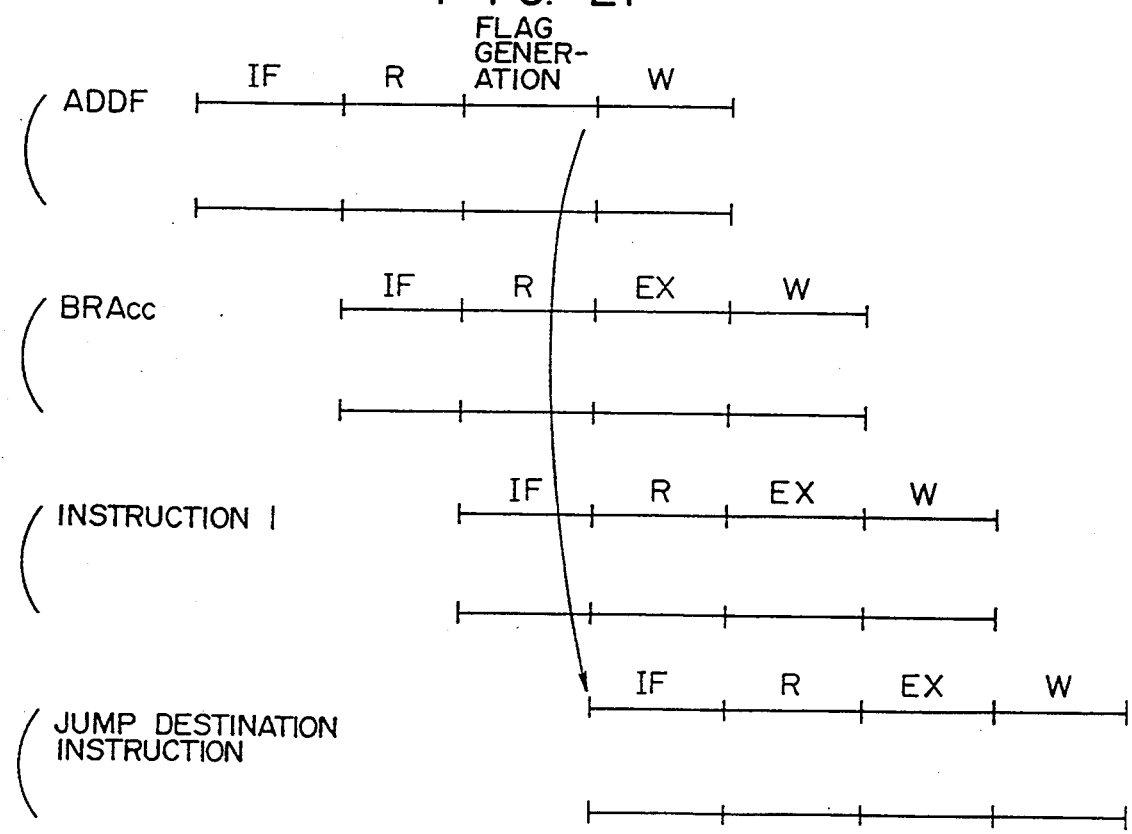

FIG. 21 shows the processing flow of the conditional branch instruction BRAcc. A flag is set by an instruction denoted by ADD, F, and it is decided in accordance with that result, whether branch should be performed or not. At this time as well, an instruction of an address succeeding that of the BRAcc instruction, i.e., instruction 1 of FIG. 21 is read out and processed in the same way as the processing of the unconditional branch instruction described before by referring to FIG. 20. In the processing flow of this instruction, the result of arithmetic operation is written into the register file at the W stage, whether the branch condition of the BRAcc instruction is satisfied or not.

When the value of the processing state flag PE 116 is "OFF", one instruction is processed every machine cycle as heretofore described by referring to FIGS. 18 to 21, resulting in an advantage of compatibility with conventional software.

An embodiment of the processing means changeover scheme, which has high-degree parallel processing means and successive processing means having compatibility with respect to conventional software and which is based upon the processing state flag has heretofore been described.

In the successive processing means of the present embodiment, one instruction is read at a time and executed in the first arithmetic unit. As understood from FIG. 1B, however, two instruction registers 104 and 105 are present. In alternative configuration, therefore, the program counter is controlled so as to increase its count by +2 at a time. Two instructions are read into the first instruction register 104 and the second instruction register 105 and held therein. The instruction of the first instruction register 104 is executed in the first arithmetic unit 108. The instruction of the second instruction register 105 is executed in the second arithmetic unit 109. That is to say, the instruction cache need only operate once every two cycles with the exception of branch instructions.

Assuming now that the value of the processing state flag PE 116 of the processor status register 103 is "OFF", the operation of "means for reading out m instructions and for performing successive processing" will now be described by referring to FIG. 1B again.

At the IF stage, two instructions indicated by the program counter are read out and set into the first instruction register 104 and the second instruction register via the buses 117 and 118, respectively. When the PC is an even number, an instruction of address PC is stored into the first instruction register, and an instruction of address PC+1 is stored into the second instruction register. When the PC is an odd number, an NOP instruction is set into the first instruction register, and an instruction of address PC is set into the second instruction register. That is to say, the sequencer 111 is a circuit for controlling the program counter. When neither the first instruction register nor the second instruction register contains a branch instruction, a value equivalent to the previous program counter value plus 2 is set into the latch 102 as the program count. At the time of branching, the branch address is calculated and set into the program counter. At the time of conditional branch, it is judged whether branch should be performed or not oh the basis of flag information 120 supplied from the first arithmetic unit 108 and flag information 119 supplied from the second arithmetic unit 109. The program counter arithmetic unit 101 is controlled by the branch destination address information 121 and the branch control information 122. As described later, respective instructions stored in the first instruction register and the second instruction register are successively processed at later stages. Therefore, the instruction cache need not operate every machine cycle, but need only operate once every two machine cycles.

Operation of the R stage in the basic instruction processing will now be described. At the R stage, contents of the first instruction register 104 are decoded by the first instruction decoder 106. Succeedingly at the next stage, contents of the second instruction register 105 are decoded by the second instruction decoder 107. As a result, contents of a register indicated by the first source register field S1 of the first instruction register 104 and contents of a register indicated by a second source register field S2 are transmitted to the first arithmetic unit 108 through the buses 127 and 128, respectively. Succeedingly at the next stage, contents of a register indicated by the first source register field S1 of the second instruction register 105 and contents of a register indicated by the second source register field S2 are transmitted to the second arithmetic unit 109 through the buses 129 and 130, respectively.

Operation of the EX stage will now be described. At the EX stage, arithmetic operation between data transmitted through the buses 127 and 128 is conducted in the first arithmetic unit 108 in accordance with contents of the operation code of the first instruction register 104. Succeedingly at the next stage, arithmetic operation between data transmitted through the buses 129 and 130 is conducted in the second arithmetic unit 109 in accordance with contents of the operation code of the second instruction register 105.

Finally, operation of the W stage will be described. At the W stage, the result of the arithmetic operation conducted in the first arithmetic unit 108 is stored into a register indicated by the destination field D of the first instruction register through the bus 131. Succeedingly at the next stage, the result of the arithmetic operation conducted in the second arithmetic unit 109 is stored into a register indicated by the destination field D of the second instruction register through the bus 132.

Figure 22:
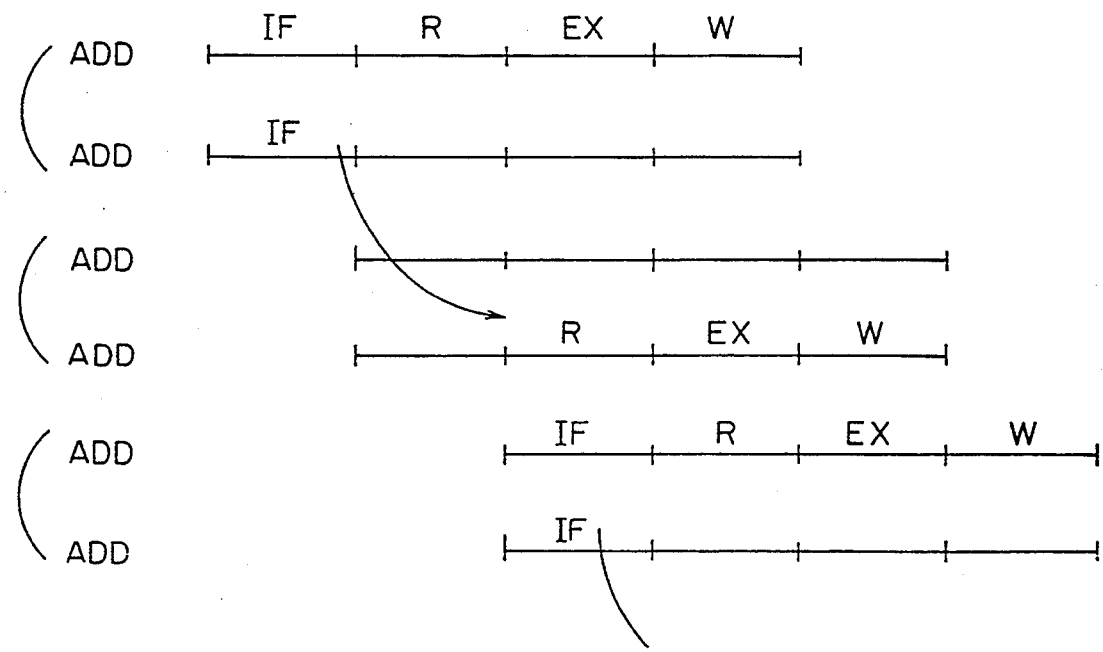

FIG. 22 shows the flow of consecutive processing of the basic instruction ADD. Although there is a capability to process two instructions every machine cycle, one instruction is processed every machine cycle. That is to say, two ADD instructions are simultaneously fetched, but only the first ADD instruction executes processing of the R stage. On the other hand, the second ADD instruction executes processing of the R stage after a wait of one machine cycle. In two lines of FIG. 22 representing the processing of two instructions, the upper line represents the processing performed in the first arithmetic unit whereas the lower line represents the processing performed in the second arithmetic unit.

Figure 23:
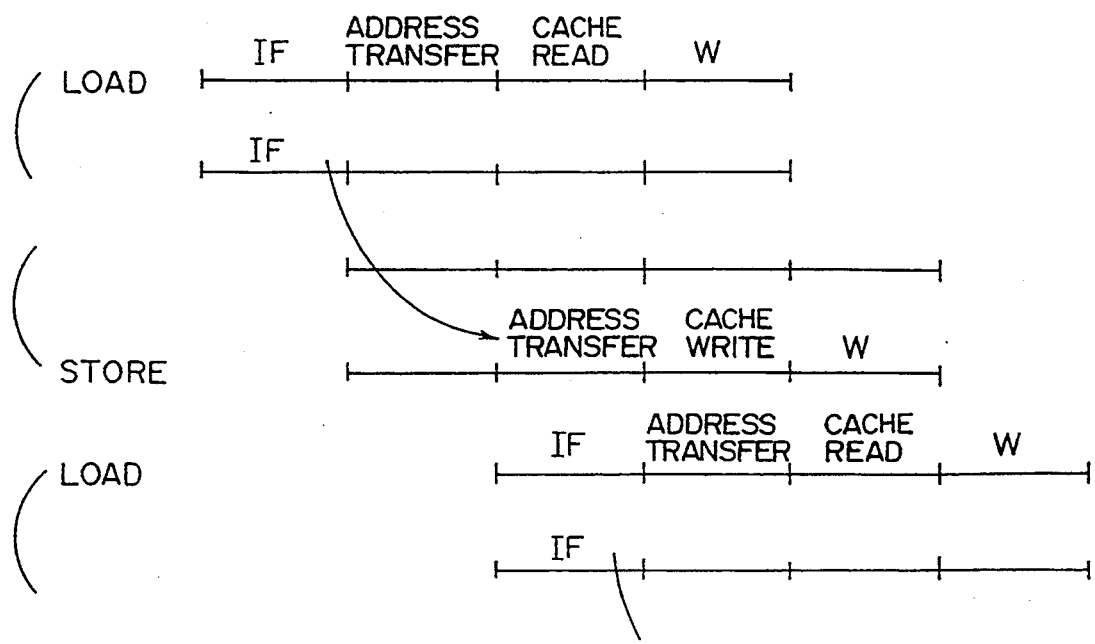

FIG. 23 shows the flow of consecutive processing of the load instruction and the store instruction. When the load instruction is to be executed, contents of a register specified by the S2 field of the first instruction register are transferred to the MAR 112 through the bus 128 at the R stage. Succeedingly at the EX stage, an operand is fetched from the data cache through the bus 133. Finally at the W stage, the operand fetched at the W stage is stored into a register specified by the destination field D of the first instruction register through the bus 134. If the high-speed data cache 115 is provided as shown in FIG. 1A, it is possible to fetch the operand in one machine cycle at the EX stage.

As for the execution of the store instruction, contents of a register specified by the second source register field S1 of the second instruction register are transferred to the MWR 114 through the bus 135 as data at the R stage after execution of the R stage of the load instruction. At the same time, contents of a register specified by the second source register field S2 of the second instruction register are transferred to the MAR 112 through the bus 129 as an address. Succeedingly at the EX stage, data stored in the MWR 114 is written into the address specified by the MAR 112. Although there is a capability to process two instructions every machine cycle, one instruction can be processed every machine cycle even if the load instruction and the store instruction are consecutive as shown in FIG. 23.

Figure 24:
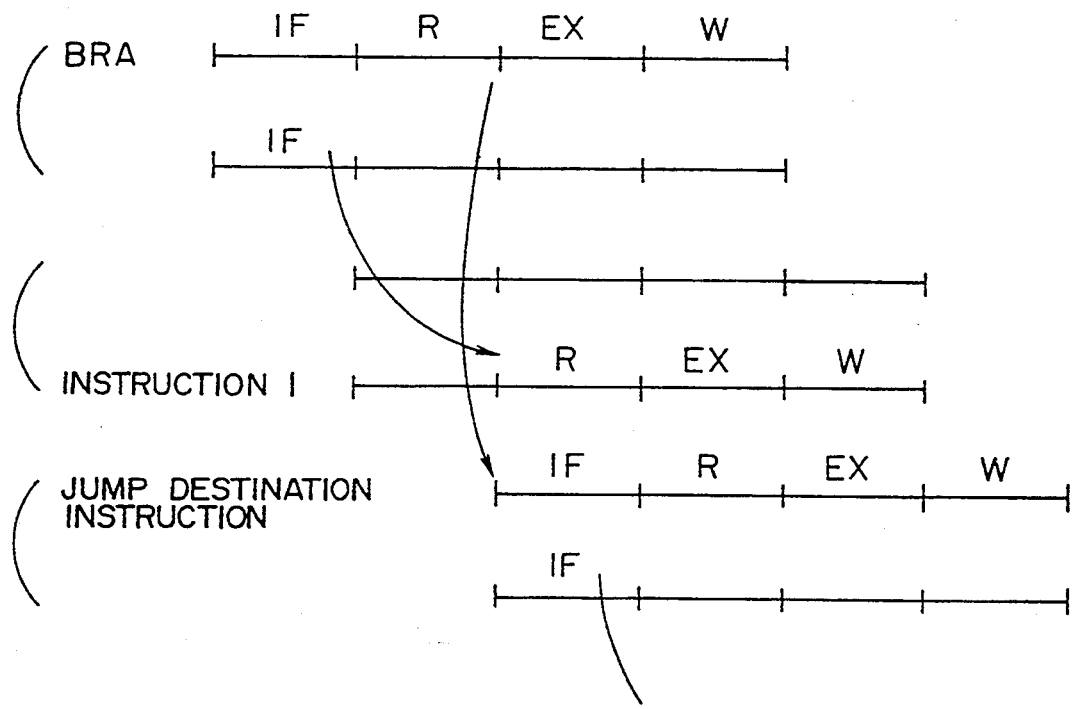
Figure 25:
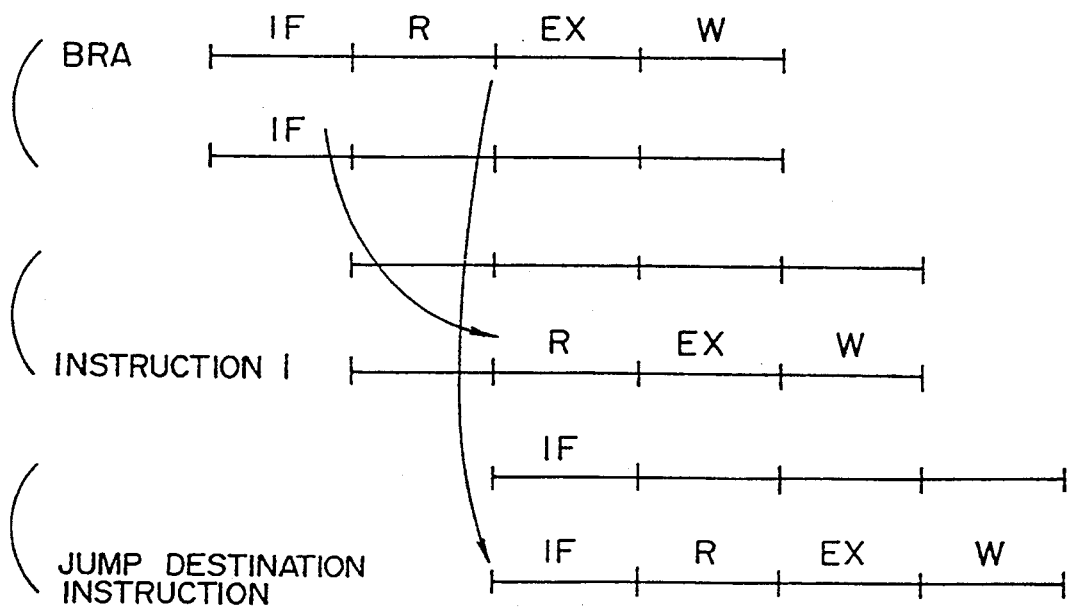
Figure 26:
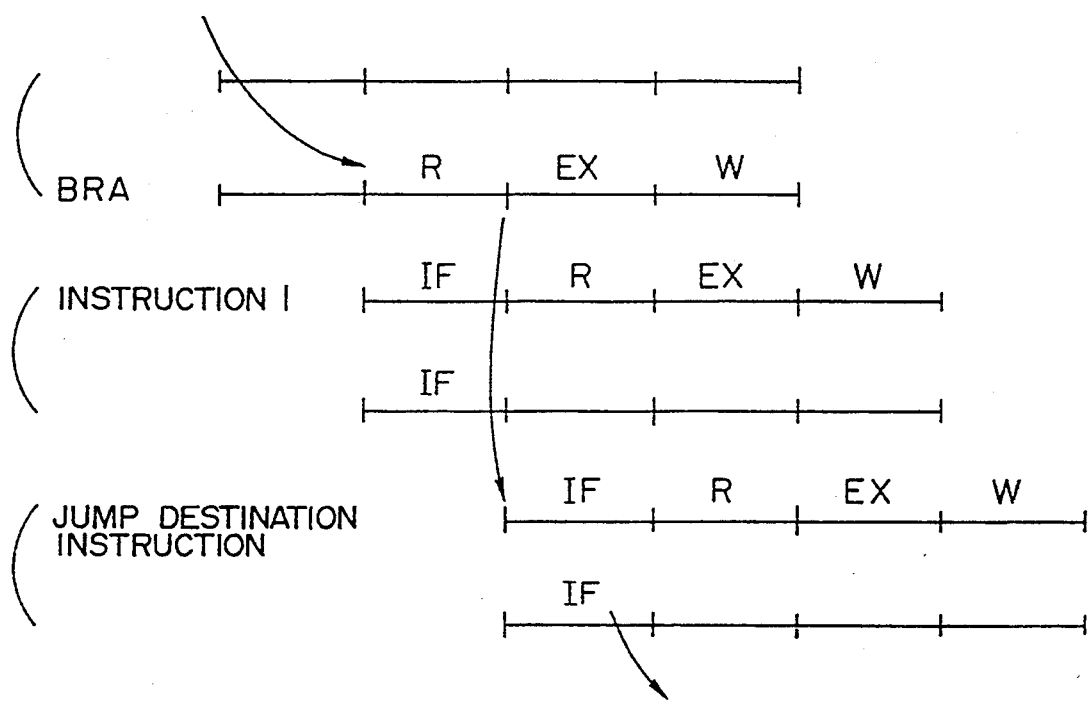
FIGS. 26, 27, 28, 29, 30 and 31 are time charts illustrating the operation in parallel processing of the present invention.
Figure 27:
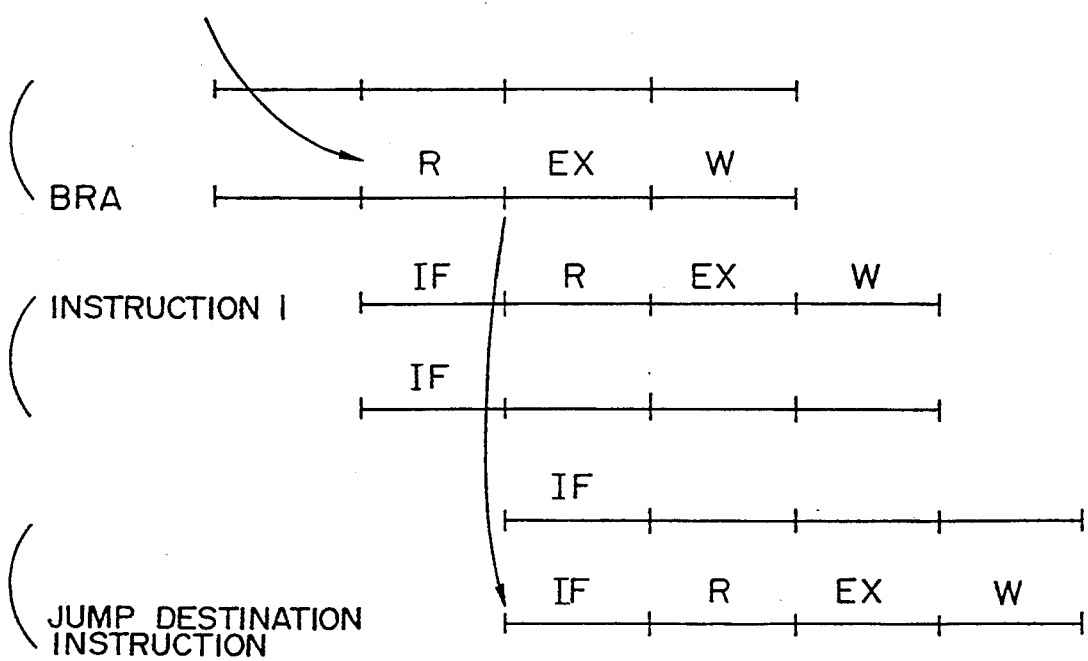

FIGS. 24 to 27 show the processing flow used when the unconditional jump instruction BRA and an instruction 1 located at an address succeeding that of the unconditional jump instruction BRA are to be executed. FIGS. 24 and 25 show pipeline processing flow used when the unconditional jump instruction BRA exists in the first instruction. FIGS. 26 and 27 show pipeline processing flow used when the unconditional jump instruction BRA exists in the second instruction. Further, FIGS. 24 and 26 show the case where the jump destination instruction is located at an address corresponding to the first instruction. FIGS. 25 and 27 show the case where the jump destination instruction is located at an address corresponding to the second instruction. If the BRA instruction is read out from the instruction register, the sequencer 111 adds the displacement field d to the program count and sets the result into the latch 102 of the program counter at the R stage. During this time, an instruction located at an address succeeding that of the BRA instruction is executed at the next cycle. At a cycle succeeding the next cycle, two instructions of jump destination are read out.

When the unconditional jump instruction BRA is present in the second instruction (FIGS. 26 and 27), two instructions including an instruction located at an address succeeding that of the BRA instruction are read out from the instruction cache at the IF stage. Although the first instruction is executed, the second instruction is not executed but the instruction of jump destination is executed. Even if instructions located after an instruction immediately succeeding the branch instruction are held in the instruction register, they are not executed but invalidated.

When the jump destination instruction is present in an address corresponding to the second instruction (FIGS. 25 and 27), two instructions including the jump destination instruction are read out from the instruction cache at the IF stage. However, the first instruction of jump destination is not executed. Only the second instruction of jump destination is executed. Even if instructions located before the jump destination instruction are held in the instruction register, they are not executed but invalidated. The CALL instruction and the RTN instruction are processed in similar flows.

Figure 28:
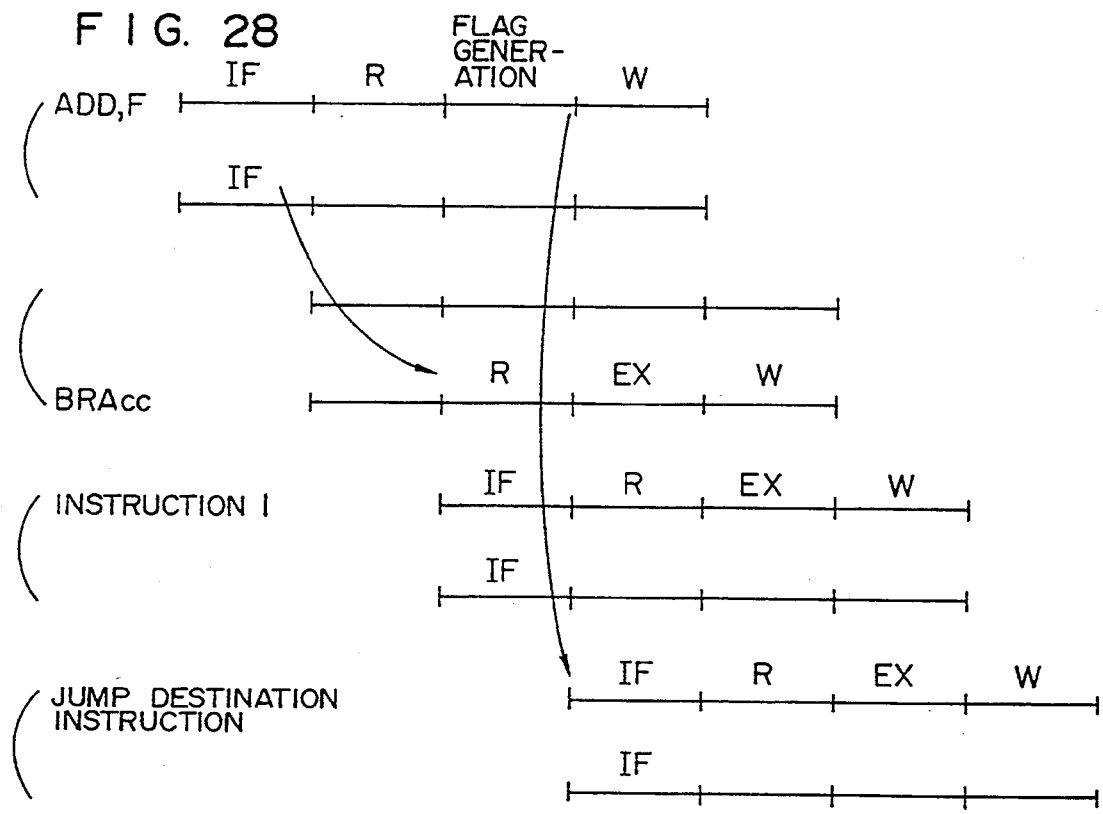
Figure 29:
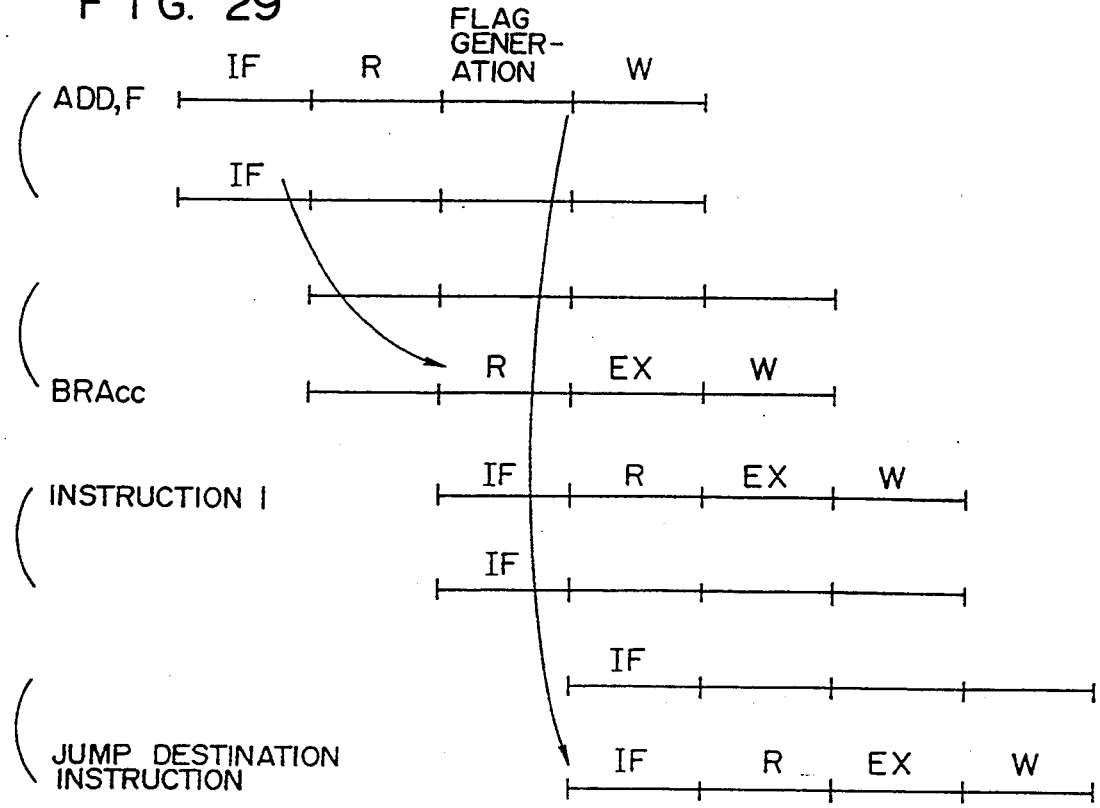
Figure 30:
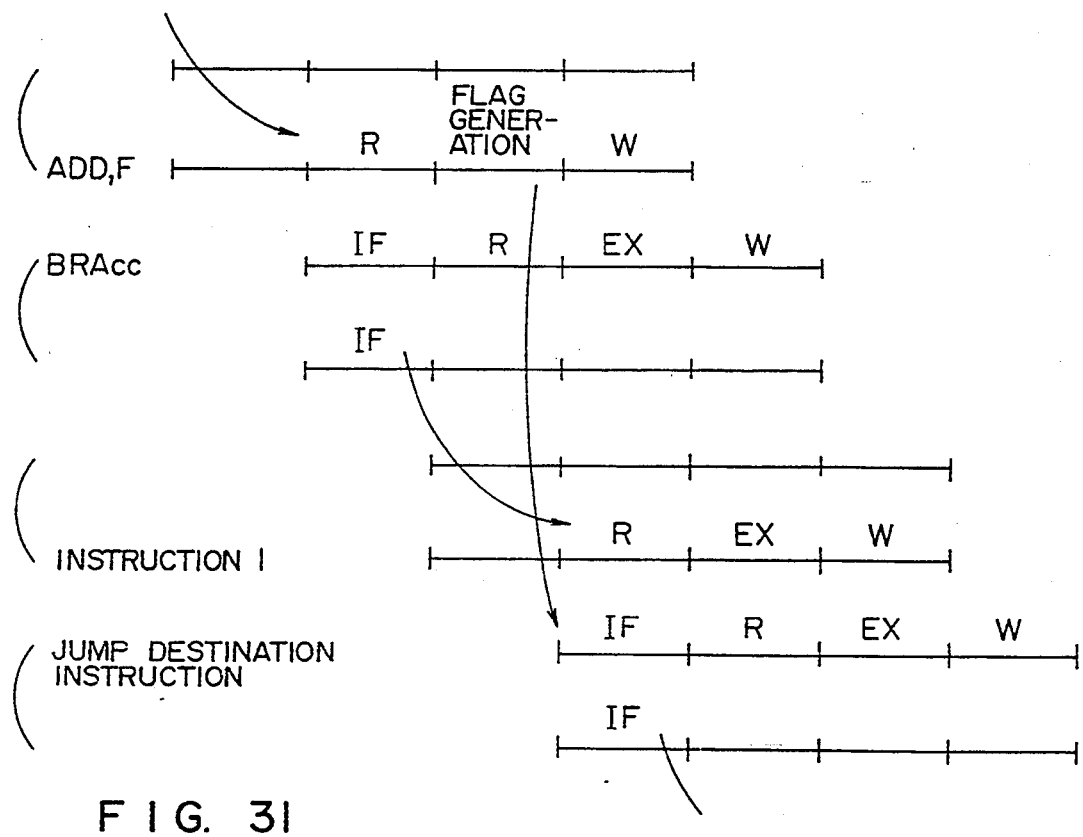
Figure 31:
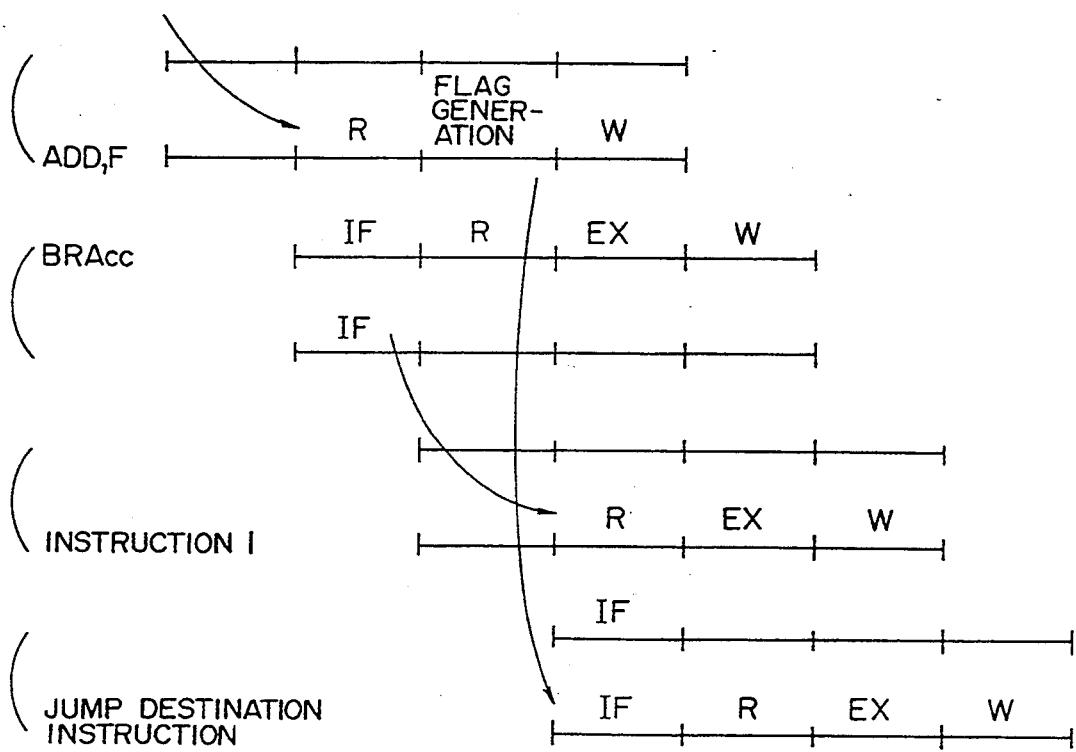

FIGS. 28 to 31 show processing flows used when the conditional branch instruction BRAcc and the instruction 1 are executed. FIGS. 30 and 31 show processing flows used when the conditional branch instruction BRAcc is present in the first instruction. FIGS. 28 and 29 show processing flows used when the conditional branch instruction BRAcc is present in the second instruction. Further, FIGS. 28 and 30 show processing flows used when the jump destination instruction is located at an address corresponding to the first instruction. FIGS. 29 and 31 show processing flows used when the jump destination instruction is located at an address corresponding to the second instruction. In FIGS. 28 to 31, a flag is set by an instruction denoted by ADD, F. In accordance with that result, it is decided whether branch should be performed or not. At this time as well, an instruction 1 located at an address succeeding that of the BRAcc instruction is executed in the same way as the processing of an unconditional branch instruction described before by referring to FIGS. 24 to 27. At the W stage in the processing flow of the instruction 1, the result of arithmetic operation is written into the register file whether the branch condition of the BRAcc instruction is satisfied or not.

It is now assumed that the BRA instruction exists as the first instruction as shown in FIGS. 30 and 31. If the BRAcc instruction is read out from the instruction register, the sequencer 111 adds the displacement field d to the program count at the R stage, sets the result into the latch 102 of the program counter, and performs parallel processing for reading out the operand of the instruction 1. During this time, an instruction located at an address succeeding that of the instruction 1 is executed in the next cycle. Two instructions of jump destination are read out in a cycle succeeding the next cycle.

When the conditional branch instruction BRAcc is present in the second instruction (FIGS. 28 and 29), two instructions including an instruction located at an address succeeding that of the BRAcc instruction are read out from the instruction cache at the IF stage. Although the first instruction is executed, the second instruction is not executed but the instruction of jump destination is executed. Even if instructions located after an instruction immediately succeeding the conditional branch instruction are held in the instruction register, they are not executed but invalidated.

Further, a conditional branch instruction is executed. When the condition is satisfied, jumping is performed. When the jump destination instruction is present in an address corresponding to the second instruction (FIGS. 29 and 31), two instructions including the jump destination instruction are read out from the instruction cache at the IF stage. However, the first instruction is not executed. The jump destination instruction of the second instruction is executed. Even if instructions located before the jump destination instruction are held in the instruction register, they are not executed but invalidated.

Operation of "means for simultaneously reading out m instructions and successively processing the m instructions in m arithmetic units" has heretofore been described. Eventually, there is provided means (successive processing means) for so controlling the program counter as to increase its count by +2 at a time, reading out two instructions to store them into the first instruction register 104 and the second instruction register 105, executing the instruction of the first instruction register 104 in the first arithmetic unit 108, succeedingly executing the instruction of the second instruction register 105 in the second arithmetic unit 109. As a result, the instruction cache need only operate once every two cycles with the exception of branch instructions.

An embodiment of the processing means changeover scheme, which has high-degree parallel processing means and successive processing means having compatibility with respect to conventional software and which is based upon the processing state flag has heretofore been described.

Figure 1C:
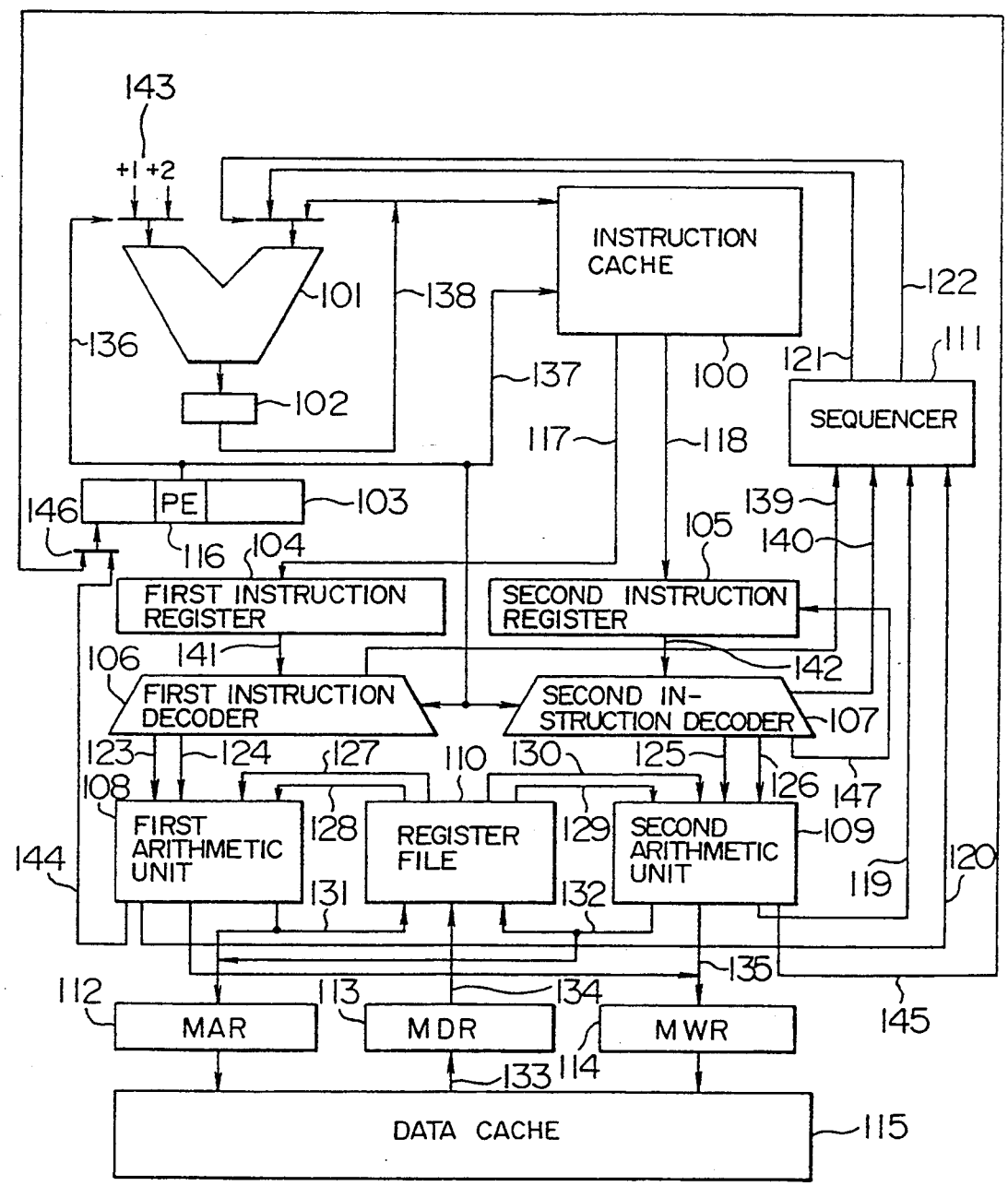
FIG. 1C is a general block diagram showing a further embodiment of the present invention.
Figure 2:
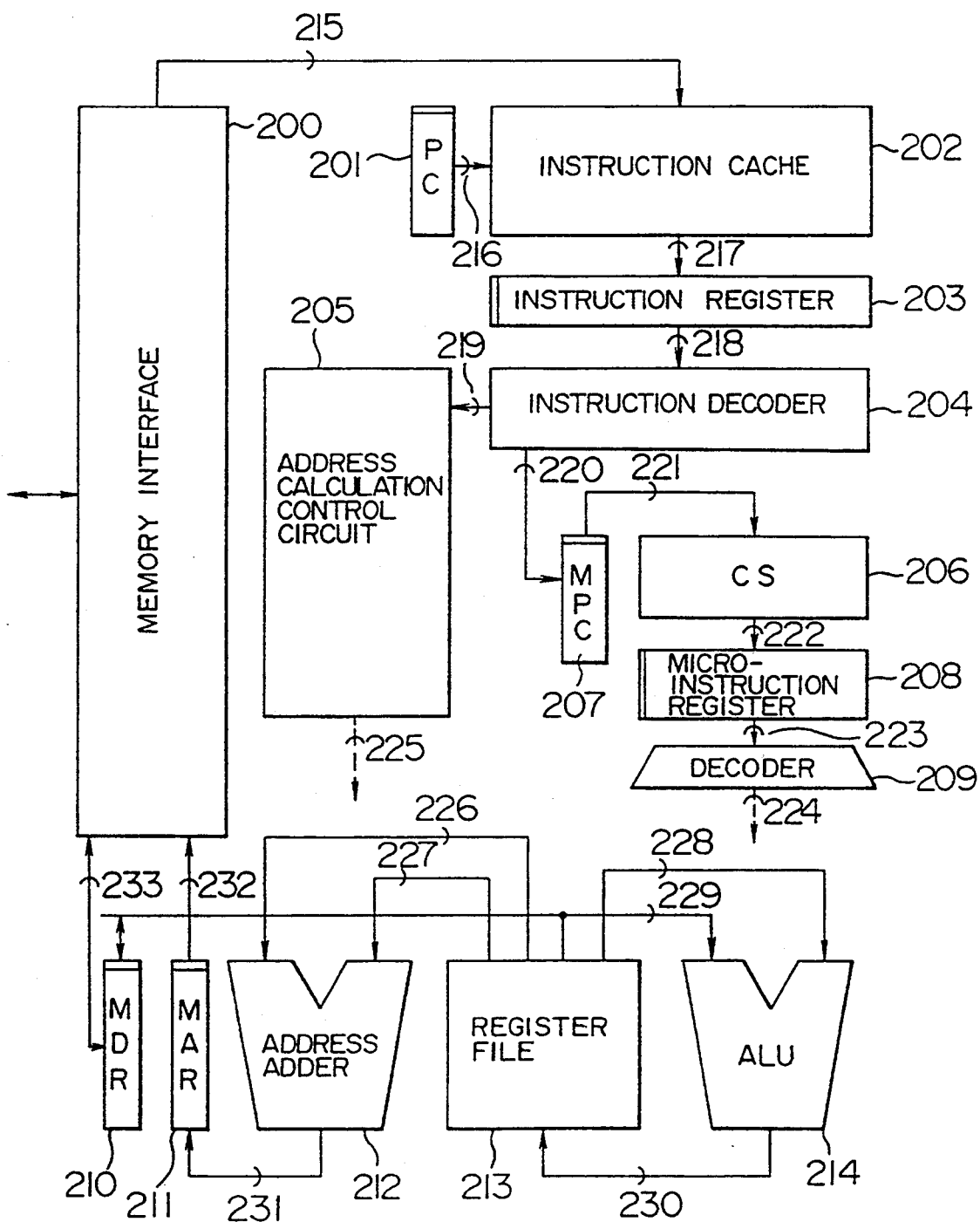
FIG. 2 is a general block diagram of an example of the prior art.
Figure 3:
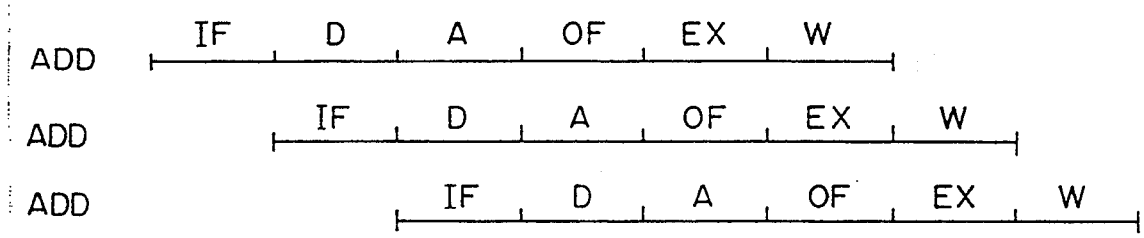
FIGS. 3, 4 and 5 are time charts illustrating the operation performed in the configuration shown in FIG. 2.
Figure 4:
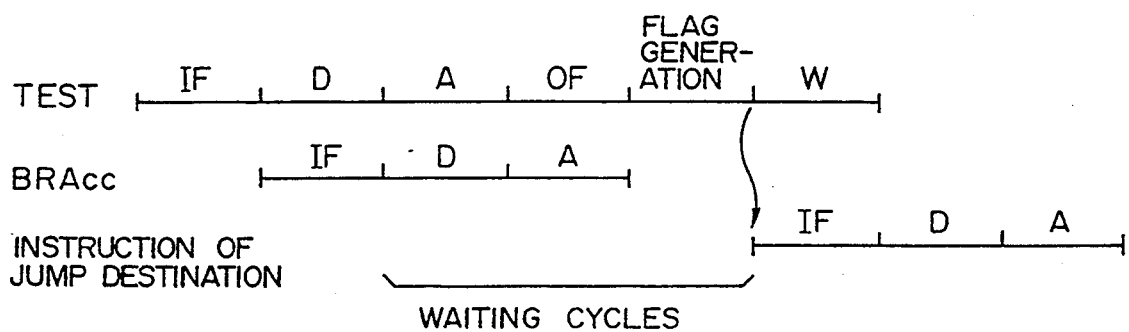
Figure 5:
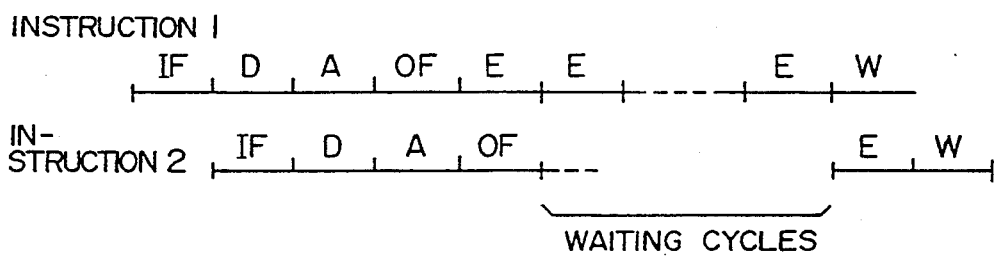
Figure 6:
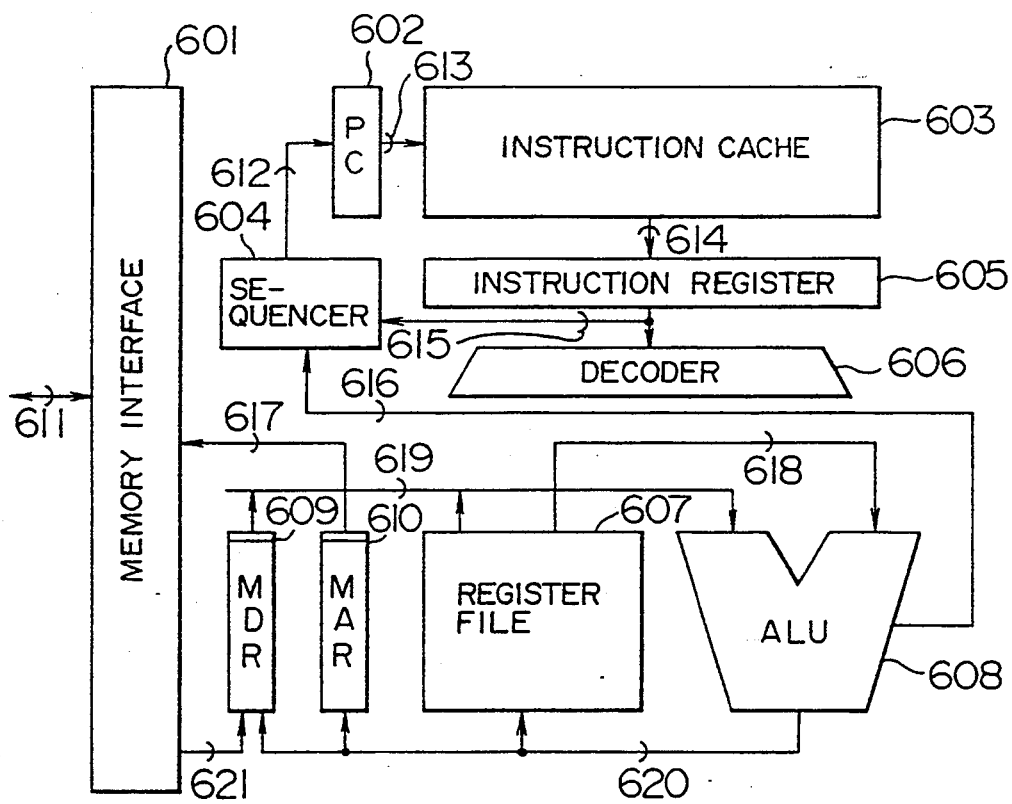
FIG. 6 is a general block diagram of another example of the prior art.
Figure 7:
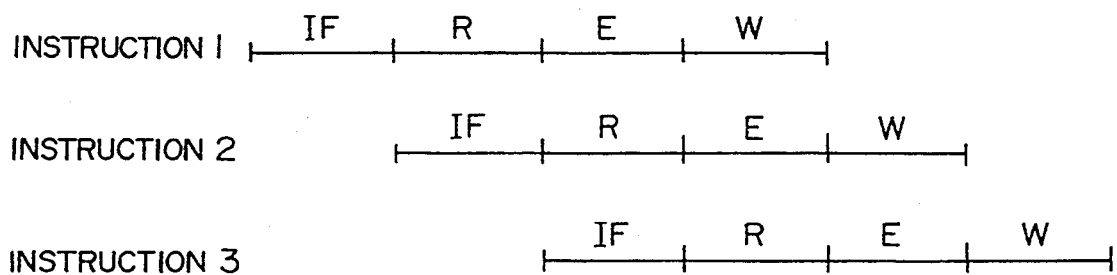
FIGS. 7 and 8 are time charts illustrating the operation performed in the configuration shown in FIG. 6.
Figure 8:
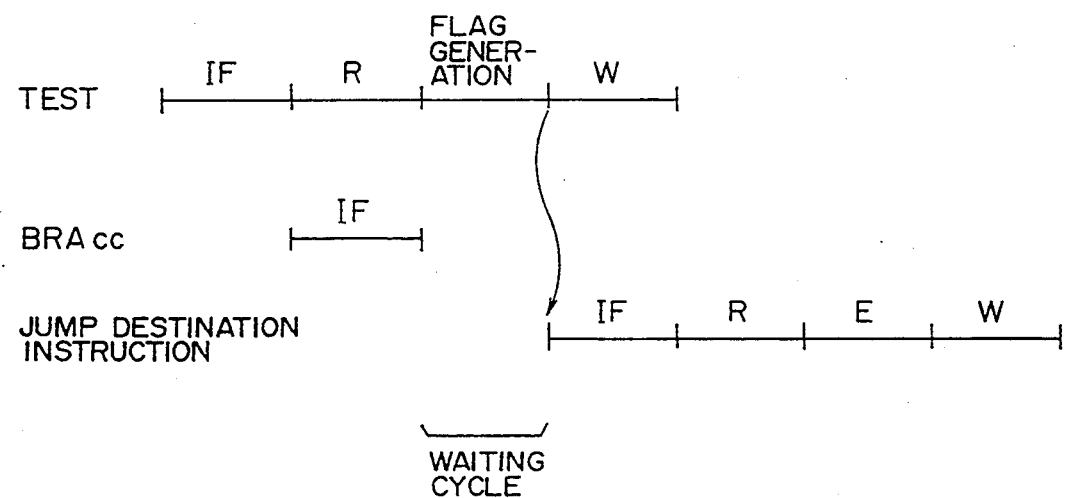
Figure 9:
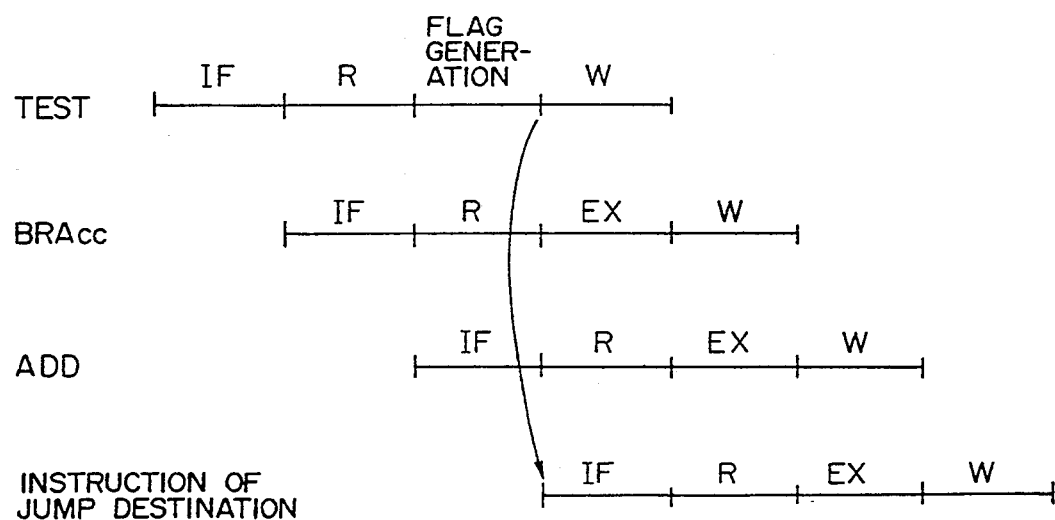
FIG. 9 is a processing flow chart of a delayed branch instruction in an RISC computer.

When the value of the processing state flag PE 116 of the processor status register 103 shown in FIG. 1A is "ON", two instructions are processed every machine cycle. When the parallel execution processing means of the present embodiment is used, therefore, the processing capability is raised to twice at its maximum. As shown in FIGS. 14 to 17, however, delayed branch instructions are expanded and hence compatibility with respect to conventional software is lost. Therefore, a method for maintaining compatibility with respect to a great part of software by providing control means for executing only one instruction succeeding the delayed branch instruction will now be described. FIG. 1C is obtained by adding a control signal line 147 to FIG. 1B. When a delayed branch instruction is decoded in the second instruction decoder 107, a succeeding delay slot instruction is present in the first instruction register 104. However, an instruction held in the second instruction register 105 is an instruction which must not be executed. When the second instruction decoder 107 has detected a delayed branch instruction, only one instruction succeeding the delayed branch instruction is executed by invalidating the contents of the second instruction register 105 via the control signal line 147. When the delayed branch instruction is decoded in the first instruction decoder 106, the succeeding delay slot instruction is being decoded in the second instruction decoder 107. Therefore, parallel execution does not pose a problem. By invalidating the contents of the second instruction register 105 by means of the control signal line 147 as heretofore described, compatibility with respect to a great part of software can be maintained.

There will now be described an embodiment of "a scheme capable of correctly executing a great part of conventional software" based upon always performing parallel processing without using the processing state flag.

The present embodiment comprises means for processing basically two instructions at a time with respect to processing excluding branch instructions, executing only one succeeding instruction (i.e., only instruction 1 in FIGS. 14B-17) with respect to branch instructions, and preventing execution of remaining instructions.

FIG. 14A shows configuration based upon performing always parallel processing. That is to say, addition of +2 is always performed in the program counter arithmetic unit 101 (143). By invalidating the contents of the second instruction register 105 by means of the control signal line 147, however, software compatibility can be maintained. Operation of the configuration shown in FIG. 14A will hereafter be described by referring to FIGS. 14B to 17. FIG. 14B has already been used for the description of the above described embodiment.

FIG. 14B shows the processing flow used when the unconditional jump instruction BRA is executed as the second instruction. Upon reading the BRA instruction, the sequencer 111 adds the displacement field d to the program count and sets the result into the latch 102 of the program counter at the R stage. During this time, instructions 1 and 2 located at addresses succeeding that of the BRA instruction are read out. In the next cycle, two instructions of jump destination are read out. In the present embodiment, only the instruction 1 is executed and execution of the instruction 2 is prevented. That is to say, control is so exercised that only one instruction succeeding the branch instruction BRA may be executed in order to maintain compatibility with respect to conventional software. That is to say, the instruction 2 of FIG. 14B can be processed by exercising control via the signal line 147 so as to attain processing equivalent to the NOP instruction in the second instruction decoder 107 of FIG. 14A or prevent writing the second instruction into the register file. Code is so generated by the compiler that as effective instructions as possible may be executed during address calculation of the branch instruction. When there is nothing to do, the instruction 1 of FIG. 14B is chosen as the NOP instruction. At this time, a wait of substantially one machine cycle is caused.

FIG. 15 shows processing flow used when a conditional branch instruction BRAcc is executed as the second instruction. A flag is set by an instruction denoted by ADD, F, and it is decided in accordance with that result whether branch should be performed or not. At this time as well, instructions of addresses succeeding that of the BRAcc instruction, i.e., instructions 1 and 2 of FIG. 15 are read out in the same way as the unconditional branch instruction described before by referring to FIG. 14B. In the processing flow of the instruction 1, the result of arithmetic operation is written into the register file at the W stage, whether the branch condition of the BRAcc instruction is satisfied or not. On the other hand, execution of the instruction 2 is prevented. That is to say, the instruction 2 of FIG. 15 can be processed by exercising control so as to attain processing equivalent to the NOP instruction in the second instruction decoder 107 of FIG. 14A or prevent writing the second instruction into the register file. At this time, a wait of substantially one machine cycle is caused.

FIG. 16 shows the processing flow used when an unconditional jump instruction BRA is executed as the first instruction. If the BRA instruction and the instruction 1 are read out, the sequencer 111 adds the displacement field d to the program count at the R stage and sets the resultant sum into the latch 102 of the program counter. At the same time, the operand of the instruction 1 is read. During this time, succeeding instructions 2 and 3 are read out. In the next cycle, instructions 1 and 2 of jump destination are read out. In order to attain compatibility with respect to conventional software, the branch instruction BRA and the succeeding instruction 1 are executed in parallel. However, execution of the instructions 2 and 3 is prevented. That is to say, the instructions 2 and 3 of FIG. 16 can be processed by exercising control so as to attain processing equivalent to the NOP instruction in the first instruction decoder 106 and the second instruction decoder 107 of FIG. 14A or prevent writing the second and third instructions into the register file. Codes are generated by the compiler so that as effective instructions as possible may be executed during address calculation of a branch instruction. When there is nothing to be done, however, the NOP instruction is chosen as the instruction 1 of FIG. 16. At this time, a wait of substantially one machine cycle is caused.

FIG. 17 shows processing flow used when the conditional branch instruction BRAcc is executed as the first instruction. A branch state flag is set by the instruction denoted by ADD, F, and it is decided in accordance with that result whether branch should be performed or not. At this time as well, the BRAcc instruction and the instruction 1 located at an address succeeding that of the BRAcc instruction are simultaneously read out in the same way as the unconditional branch instruction described before by referring to FIG. 16. In the processing flow of the instruction 1, the result of arithmetic operation is written into the register file at the W stage, whether the branch condition of the BRAcc instruction is satisfied or not. The instructions 2 and 3 of FIG. 17 can be processed by exercising control so as to attain processing equivalent to the NOP instruction in the first instruction decoder 106 and the second instruction decoder 107 of FIG. 14A, prevent writing the second and third instructions into the register file, or branch to the jump destination instruction 1 after parallel execution of the instruction 1 in case the branch instruction is the first instruction.

By referring to FIG. 14A, operation of the scheme which makes a great part of conventional software operate normally and raises the operation speed by parallel execution has heretofore been described. Eventually, execution of the instruction 2 of FIGS. 14B and 15 as well as the instructions 2 and 3 of FIGS. 16 and 17 is prevented. As a result, compatibility of the conventional delayed branch scheme effectively taking advantage of one waiting cycle can be maintained. As for other instructions, two instructions can be fundamentally executed in parallel. Therefore, both compatibility with respect to conventional software and improvement of processing performance at a ratio of one to twice are accomplished.

Laying stress on the branch instruction, parallel execution processing means has heretofore been described. It is a matter of course that the first instruction and the second instruction cannot often be executed simultaneously depending upon the combination of them. This is herein referred to as racing. Racing will hereafter be described.

1. Combination of the load instruction and the store instruction.
2. When a register indicated by the destination register field D of the first instruction coincides with a register indicated by the first source register field S1 of the second instruction or a register indicated by the second source register field S2 of the second instruction.

The racing described above "1." is a problem peculiar to the present embodiment caused by the fact that a plurality of instructions cannot access the data cache simultaneously. This problem can be solved by providing the data cache with two ports, for example. The racing caused by "2." can be solved by comparing the source register field with the destination register field in the first instruction decoder and the second instruction decoder of FIG. 14A and by changing the second instruction into the NOP instruction in case of coincidence. That is to say, when the register indicated by the destination register field D of the first instruction coincides with the register indicated by two source register fields of the second instruction, the second instruction is changed into the NOP instruction, and the first instruction and the NOP instruction are executed in parallel processing. In the next cycle, the first instruction is changed into the NOP instruction, and the NOP instruction and the second instruction are executed in parallel.

The racing problem in parallel processing has heretofore been described.

Every embodiment of the present invention heretofore described comprises two instruction decoders and two arithmetic units. However, it is evident that no problem is posed even if the number of instruction decoders and arithmetic units is increased to 4, 8 and so on.

The final embodiment of the present invention will now be described. This relates to the processing state flag PE 116 of the processor status register 103 shown in FIG. 1. Originally, in a system needing compatibility with conventional software, the processing state flag PE 116 functions to change over hardware by using switchable means as an information source and an instruction for change-over.

In a special purpose system or a system which need only execute newly created software alone, however, only one of the functions is used in some cases when the system is constructed. Therefore, the data processing apparatus must comprise both the parallel execution processing means and the successive execution processing means as well as means for incorporating either of these means depending upon the system to be constructed. One of means realizing this function sets the processing state flag PE 116 of the processor status register 103 into either state in response to an instruction at the time of initialization or at the time of resetting. Further, in case of an LSI such as a microprocessor, a pin for exchanging signals between the LSI and the outside may be used to select either of the above described two means.

The present invention makes all software operating on conventional computers of successive processing type operate normally and allows execution of them at a higher speed by using high-degree parallel processing function. Therefore, the processing time can be shortened. Further, the present invention makes a great part of conventional software operate normally and allows execution thereof at a higher speed by using high-degree parallel processing function.

What is claimed is:

1. A parallel processing apparatus, comprising:
   a program counter for indicating instructions to be read out from a memory;
   a plurality of instruction registers for respectively storing instructions therein indicated by said program counter;
   a plurality of arithmetic units for executing arithmetic operations;
   means for controlling said plurality of arithmetic units to effect either parallel processing of a plurality of consecutive instructions read out from an address of said memory indicated by said program counter in said plurality of arithmetic units, or successive processing of n consecutive instructions, read out from an address of said memory indicated by said program counter, in which said n consecutive instructions correspond to said plurality of arithmetic units, respectively, when the instruction is supplied to each of the arithmetic units from the instruction register.

2. A parallel processing apparatus according to claim 1, said means for controlling said plurality of arithmetic units in response to either a processing state alteration instruction or control signal through pin which has said parallel processing apparatus from outside.

3. A parallel processing apparatus according to claim 1, further comprising means for controlling said program counter to increment either m or 1 according to a value indicated by said processing state flag.

4. A parallel processing apparatus according to claim 1, further including a sequencer for controlling said program counter, said sequencer comprising a wired-logic circuit.

5. A parallel processing apparatus according to claim 1, further including a sequencer for controlling said program counter, said sequencer being implemented by a microprogram.

* * * * *